(12) United States Patent
Perevozchikov et al.

(10) Patent No.: US 10,890,186 B2
(45) Date of Patent: Jan. 12, 2021

(54) COMPRESSOR

(71) Applicant: Emerson Climate Technologies, Inc., Sidney, OH (US)

(72) Inventors: Michael M. Perevozchikov, Tipp City, OH (US); Kirill M. Ignatiev, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 439 days.

(21) Appl. No.: 15/682,599

(22) Filed: Aug. 22, 2017

(65) Prior Publication Data

US 2018/0066657 A1 Mar. 8, 2018

Related U.S. Application Data

(60) Provisional application No. 62/455,679, filed on Feb. 7, 2017, provisional application No. 62/384,976, filed on Sep. 8, 2016.

(51) Int. Cl.
*F04C 18/02* (2006.01)
*F04C 23/00* (2006.01)
(Continued)

(52) U.S. Cl.
CPC .......... *F04C 23/008* (2013.01); *F01C 21/007* (2013.01); *F04C 23/02* (2013.01);
(Continued)

(58) Field of Classification Search
CPC ........ F04C 23/008; F04C 23/02; F04C 29/04; F04C 29/045; F04C 29/12; F04C 29/00;
(Continued)

(56) References Cited

U.S. PATENT DOCUMENTS 4,058,988 A 11/1977 Shaw
4,216,661 A 8/1980 Tojo et al.
(Continued)

FOREIGN PATENT DOCUMENTS

CN 1137614 A 12/1996
CN 1158944 A 9/1997
(Continued)

OTHER PUBLICATIONS

U.S. Appl. No. 15/692,844, filed Aug. 31, 2017, Michael M. Perevozchikov et al.
(Continued)

*Primary Examiner* — Charles G Freay
*Assistant Examiner* — Thomas Fink
(74) *Attorney, Agent, or Firm* — Harness, Dickey & Pierce, P.L.C.

(57) ABSTRACT

A compressor may include a shell, a compression mechanism, a driveshaft, a motor assembly, and a stator support member. The compression mechanism is disposed within the shell. The driveshaft drivingly is engaged with the compression mechanism. The motor assembly may be disposed within the shell and is drivingly engaged with the driveshaft. The motor assembly includes a rotor and a stator. The stator is fixed relative to the shell. The rotor may include an axially extending portion and a radially extending portion. The axially extending portion may be disposed radially outward relative to the stator. The radially extending portion may engage the driveshaft and may be disposed axially between the stator and the compression mechanism. The stator support member may be fixed relative to the shell and the stator. The stator support member may extend longitudinally through at least a portion of the stator.

18 Claims, 6 Drawing Sheets

(51) Int. Cl.
  *F04C 23/02* (2006.01)
  *F01C 21/00* (2006.01)
  *F04C 29/04* (2006.01)
  *F04C 18/356* (2006.01)

(52) U.S. Cl.
  CPC .......... *F04C 29/04* (2013.01); *F04C 18/0215* (2013.01); *F04C 18/356* (2013.01); *F04C 29/045* (2013.01); *F04C 2240/10* (2013.01); *F04C 2240/40* (2013.01); *F04C 2240/50* (2013.01); *F04C 2240/60* (2013.01); *F04C 2240/603* (2013.01)

(58) Field of Classification Search
  CPC .. F04C 29/023; F04C 18/356; F04C 18/0215; F04C 18/0223; F04C 2240/603; F04C 2240/60; F04C 2240/50; F04C 2240/40; F04C 2240/10; F04C 2240/20; F04C 23/005; F01C 21/007
  See application file for complete search history.

(56) References Cited

U.S. PATENT DOCUMENTS

| | | | |
|---|---|---|---|
| 4,382,370 | A | 5/1983 | Suefuji et al. |
| 4,383,805 | A | 5/1983 | Teegarden et al. |
| 4,389,171 | A | 6/1983 | Eber et al. |
| 4,466,784 | A | 8/1984 | Hiraga |
| 4,475,360 | A | 10/1984 | Suefuji et al. |
| 4,475,875 | A | 10/1984 | Sugimoto et al. |
| 4,497,615 | A | 2/1985 | Griffith |
| 4,545,742 | A | 10/1985 | Schaefer |
| 4,547,138 | A | 10/1985 | Mabe et al. |
| 4,552,518 | A | 11/1985 | Utter |
| 4,564,339 | A | 1/1986 | Nakamura et al. |
| 4,580,949 | A | 4/1986 | Maruyama et al. |
| 4,609,329 | A | 9/1986 | Pillis et al. |
| 4,650,405 | A | 3/1987 | Iwanami et al. |
| 4,696,630 | A | 9/1987 | Sakata et al. |
| 4,727,725 | A | 3/1988 | Nagata et al. |
| 4,774,816 | A | 10/1988 | Uchikawa et al. |
| 4,818,195 | A | 4/1989 | Murayama et al. |
| 4,824,344 | A | 4/1989 | Kimura et al. |
| 4,838,773 | A | 6/1989 | Noboru |
| 4,842,499 | A | 6/1989 | Nishida et al. |
| 4,846,633 | A | 7/1989 | Suzuki et al. |
| 4,877,382 | A | 10/1989 | Caillat et al. |
| 4,886,425 | A | 12/1989 | Itahana et al. |
| 4,886,433 | A | 12/1989 | Maier |
| 4,898,520 | A | 2/1990 | Nieter et al. |
| 4,927,339 | A | 5/1990 | Riffe et al. |
| 4,940,395 | A | 7/1990 | Yamamoto et al. |
| 4,954,057 | A | 9/1990 | Caillat et al. |
| 4,990,071 | A | 2/1991 | Sugimoto |
| 5,024,589 | A | 6/1991 | Jetzer et al. |
| 5,040,952 | A | 8/1991 | Inoue et al. |
| 5,040,958 | A | 8/1991 | Arata et al. |
| 5,055,010 | A | 10/1991 | Logan |
| 5,059,098 | A | 10/1991 | Suzuki et al. |
| 5,071,323 | A | 12/1991 | Sakashita et al. |
| 5,074,760 | A | 12/1991 | Hirooka et al. |
| 5,080,056 | A | 1/1992 | Kramer et al. |
| 5,085,565 | A | 2/1992 | Barito |
| 5,098,265 | A | 3/1992 | Machida et al. |
| 5,145,346 | A | 9/1992 | Iio et al. |
| 5,152,682 | A | 10/1992 | Morozumi et al. |
| RE34,148 | E | 12/1992 | Terauchi et al. |
| 5,169,294 | A | 12/1992 | Barito |
| 5,171,141 | A | 12/1992 | Morozumi et al. |
| 5,192,195 | A | 3/1993 | Iio et al. |
| 5,193,987 | A | 3/1993 | Iio et al. |
| 5,199,862 | A | 4/1993 | Kondo et al. |
| 5,213,489 | A | 5/1993 | Kawahara et al. |
| 5,240,389 | A | 8/1993 | Oikawa et al. |
| 5,253,489 | A | 10/1993 | Yoshii |
| 5,304,047 | A | 4/1994 | Shibamoto |
| 5,318,424 | A | 6/1994 | Bush et al. |
| 5,330,463 | A | 7/1994 | Hirano |
| 5,336,068 | A | 8/1994 | Sekiya et al. |
| 5,340,287 | A | 8/1994 | Kawahara et al. |
| 5,356,271 | A | 10/1994 | Miura et al. |
| 5,411,384 | A | 5/1995 | Bass et al. |
| 5,425,626 | A | 6/1995 | Tojo et al. |
| 5,427,512 | A | 6/1995 | Kohsokabe et al. |
| 5,451,146 | A | 9/1995 | Inagaki et al. |
| 5,458,471 | A | 10/1995 | Ni |
| 5,458,472 | A | 10/1995 | Kobayashi et al. |
| 5,482,637 | A | 1/1996 | Rao et al. |
| 5,511,959 | A | 4/1996 | Tojo et al. |
| 5,547,354 | A | 8/1996 | Shimizu et al. |
| 5,551,846 | A | 9/1996 | Taylor et al. |
| 5,557,897 | A | 9/1996 | Kranz et al. |
| 5,562,426 | A | 10/1996 | Watanabe et al. |
| 5,577,897 | A | 11/1996 | Inagaki et al. |
| 5,607,288 | A | 3/1997 | Wallis et al. |
| 5,611,674 | A | 3/1997 | Bass et al. |
| 5,613,841 | A | 3/1997 | Bass et al. |
| 5,624,247 | A | 4/1997 | Nakamura |
| 5,639,225 | A | 6/1997 | Matsuda et al. |
| 5,640,854 | A | 6/1997 | Fogt et al. |
| 5,649,817 | A | 7/1997 | Yamazaki |
| 5,674,058 | A | 10/1997 | Matsuda et al. |
| 5,678,985 | A | 10/1997 | Brooke et al. |
| 5,707,210 | A | 1/1998 | Ramsey et al. |
| 5,722,257 | A | 3/1998 | Ishii et al. |
| 5,741,120 | A | 4/1998 | Bass et al. |
| 5,775,893 | A | 7/1998 | Takao et al. |
| 5,842,843 | A | 12/1998 | Haga |
| 5,855,475 | A | 1/1999 | Fujio et al. |
| 5,885,063 | A | 3/1999 | Makino et al. |
| 5,888,057 | A | 3/1999 | Kitano et al. |
| 5,938,417 | A | 8/1999 | Takao et al. |
| 5,993,171 | A | 11/1999 | Higashiyama |
| 5,993,177 | A | 11/1999 | Terauchi et al. |
| 6,030,192 | A | 2/2000 | Hill et al. |
| 6,047,557 | A | 4/2000 | Pham et al. |
| 6,068,459 | A | 5/2000 | Clarke et al. |
| 6,086,335 | A | 7/2000 | Bass et al. |
| 6,093,005 | A | 7/2000 | Nakamura |
| 6,095,765 | A | 8/2000 | Khalifa |
| 6,102,671 | A | 8/2000 | Yamamoto et al. |
| 6,123,517 | A | 9/2000 | Brooke et al. |
| 6,123,528 | A | 9/2000 | Sun et al. |
| 6,132,179 | A | 10/2000 | Higashiyama |
| 6,139,287 | A | 10/2000 | Kuroiwa et al. |
| 6,139,291 | A | 10/2000 | Perevozchikov |
| 6,149,401 | A | 11/2000 | Iwanami et al. |
| 6,152,714 | A | 11/2000 | Mitsuya et al. |
| 6,164,940 | A | 12/2000 | Terauchi et al. |
| 6,174,149 | B1 | 1/2001 | Bush |
| 6,176,686 | B1 | 1/2001 | Wallis et al. |
| 6,179,589 | B1 | 1/2001 | Bass et al. |
| 6,202,438 | B1 | 3/2001 | Barito |
| 6,210,120 | B1 | 4/2001 | Hugenroth et al. |
| 6,213,731 | B1 | 4/2001 | Doepker et al. |
| 6,231,316 | B1 | 5/2001 | Wakisaka et al. |
| 6,257,840 | B1 | 7/2001 | Ignatiev et al. |
| 6,264,444 | B1 | 7/2001 | Nakane et al. |
| 6,267,565 | B1 | 7/2001 | Seibel et al. |
| 6,273,691 | B1 | 8/2001 | Morimoto et al. |
| 6,280,154 | B1 | 8/2001 | Clendenin et al. |
| 6,290,477 | B1 | 9/2001 | Gigon |
| 6,293,767 | B1 | 9/2001 | Bass |
| 6,293,776 | B1 | 9/2001 | Hahn et al. |
| 6,309,194 | B1 | 10/2001 | Fraser et al. |
| 6,322,340 | B1 | 11/2001 | Itoh et al. |
| 6,338,912 | B1 | 1/2002 | Ban et al. |
| 6,350,111 | B1 | 2/2002 | Perevozchikov et al. |
| 6,361,890 | B1 | 3/2002 | Ban et al. |
| 6,379,123 | B1 | 4/2002 | Makino et al. |
| 6,389,837 | B1 | 5/2002 | Morozumi |
| 6,412,293 | B1 | 7/2002 | Pham et al. |
| 6,413,058 | B1 | 7/2002 | Williams et al. |
| 6,419,457 | B1 | 7/2002 | Seibel et al. |

(56) References Cited

U.S. PATENT DOCUMENTS

| | | |
|---|---|---|
| 6,428,286 B1 | 8/2002 | Shimizu et al. |
| 6,454,551 B2 | 9/2002 | Kuroki et al. |
| 6,457,948 B1 | 10/2002 | Pham |
| 6,464,481 B2 | 10/2002 | Tsubai et al. |
| 6,478,550 B2 | 11/2002 | Matsuba et al. |
| 6,506,036 B2 | 1/2003 | Tsubai et al. |
| 6,514,060 B1 | 2/2003 | Ishiguro et al. |
| 6,537,043 B1 | 3/2003 | Chen |
| 6,544,016 B2 | 4/2003 | Gennami et al. |
| 6,558,143 B2 | 5/2003 | Nakajima et al. |
| 6,589,035 B1 | 7/2003 | Tsubono et al. |
| 6,619,062 B1 | 9/2003 | Shibamoto et al. |
| 6,679,683 B2 | 1/2004 | Seibel et al. |
| 6,705,848 B2 | 3/2004 | Scancarello |
| 6,715,999 B2 | 4/2004 | Ancel et al. |
| 6,746,223 B2 | 6/2004 | Manole |
| 6,769,881 B2 | 8/2004 | Lee |
| 6,769,888 B2 | 8/2004 | Tsubono et al. |
| 6,773,242 B1 | 8/2004 | Perevozchikov |
| 6,817,847 B2 | 11/2004 | Agner |
| 6,821,092 B1 | 11/2004 | Gehret et al. |
| 6,863,510 B2 | 3/2005 | Cho |
| 6,881,046 B2 | 4/2005 | Shibamoto et al. |
| 6,884,042 B2 | 4/2005 | Zili et al. |
| 6,887,051 B2 | 5/2005 | Sakuda et al. |
| 6,893,229 B2 | 5/2005 | Choi et al. |
| 6,896,493 B2 | 5/2005 | Chang et al. |
| 6,896,498 B1 | 5/2005 | Patel |
| 6,913,448 B2 | 7/2005 | Liang et al. |
| 6,984,114 B2 | 1/2006 | Zili et al. |
| 7,018,180 B2 | 3/2006 | Koo |
| 7,029,251 B2 | 4/2006 | Chang et al. |
| 7,118,358 B2 | 10/2006 | Tsubono et al. |
| 7,137,796 B2 | 11/2006 | Tsubono et al. |
| 7,160,088 B2 | 1/2007 | Peyton |
| 7,172,395 B2 | 2/2007 | Shibamoto et al. |
| 7,207,787 B2 | 4/2007 | Liang et al. |
| 7,229,261 B2 | 6/2007 | Morimoto et al. |
| 7,255,542 B2 | 8/2007 | Lifson et al. |
| 7,261,527 B2 | 8/2007 | Alexander et al. |
| 7,311,740 B2 | 12/2007 | Williams et al. |
| 7,344,365 B2 | 3/2008 | Takeuchi et al. |
| RE40,257 E | 4/2008 | Doepker et al. |
| 7,354,259 B2 | 4/2008 | Tsubono et al. |
| 7,364,416 B2 | 4/2008 | Liang et al. |
| 7,371,057 B2 | 5/2008 | Shin et al. |
| 7,371,059 B2 | 5/2008 | Ignatiev et al. |
| RE40,399 E | 6/2008 | Hugenroth et al. |
| RE40,400 E | 6/2008 | Bass et al. |
| 7,393,190 B2 | 7/2008 | Lee et al. |
| 7,404,706 B2 | 7/2008 | Ishikawa et al. |
| RE40,554 E | 10/2008 | Bass et al. |
| 7,510,382 B2 | 3/2009 | Jeong |
| 7,547,202 B2 | 6/2009 | Knapke |
| 7,695,257 B2 | 4/2010 | Joo et al. |
| 7,717,687 B2 | 5/2010 | Reinhart |
| 7,771,178 B2 | 8/2010 | Perevozchikov et al. |
| 7,802,972 B2 | 9/2010 | Shimizu et al. |
| 7,815,423 B2 | 10/2010 | Guo et al. |
| 7,891,961 B2 | 2/2011 | Shimizu et al. |
| 7,896,629 B2 | 3/2011 | Ignatiev et al. |
| RE42,371 E | 5/2011 | Peyton |
| 7,956,501 B2 | 6/2011 | Jun et al. |
| 7,967,582 B2 | 6/2011 | Akei et al. |
| 7,967,583 B2 | 6/2011 | Stover et al. |
| 7,972,125 B2 | 7/2011 | Stover et al. |
| 7,976,289 B2 | 7/2011 | Masao |
| 7,976,295 B2 | 7/2011 | Stover et al. |
| 7,988,433 B2 | 8/2011 | Akei et al. |
| 8,025,492 B2 | 9/2011 | Seibel et al. |
| 8,303,278 B2 | 11/2012 | Roof et al. |
| 8,303,279 B2 | 11/2012 | Hahn |
| 8,308,448 B2 | 11/2012 | Fields et al. |
| 8,328,531 B2 | 12/2012 | Milliff et al. |
| 8,393,882 B2 | 3/2013 | Ignatiev et al. |
| 8,506,271 B2 | 8/2013 | Seibel et al. |
| 8,517,703 B2 | 8/2013 | Doepker |
| 8,585,382 B2 | 11/2013 | Akei et al. |
| 8,616,014 B2 | 12/2013 | Stover et al. |
| 8,790,098 B2 | 7/2014 | Stover et al. |
| 8,840,384 B2 | 9/2014 | Patel et al. |
| 8,857,200 B2 | 10/2014 | Stover et al. |
| 8,932,036 B2 | 1/2015 | Monnier et al. |
| 9,127,677 B2 | 9/2015 | Doepker |
| 9,145,891 B2 | 9/2015 | Kim et al. |
| 9,249,802 B2 | 2/2016 | Doepker et al. |
| 9,303,642 B2 | 4/2016 | Akei et al. |
| 9,435,340 B2 | 9/2016 | Doepker et al. |
| 9,494,157 B2 | 11/2016 | Doepker |
| 9,605,677 B2 | 3/2017 | Heidecker et al. |
| 9,624,928 B2 * | 4/2017 | Yamazaki ............ F04C 27/005 |
| 9,651,043 B2 | 5/2017 | Stover et al. |
| 9,777,730 B2 | 10/2017 | Doepker et al. |
| 9,790,940 B2 | 10/2017 | Doepker et al. |
| 9,879,674 B2 | 1/2018 | Akei et al. |
| 9,989,057 B2 | 6/2018 | Lochner et al. |
| 10,066,622 B2 | 9/2018 | Pax et al. |
| 10,087,936 B2 | 10/2018 | Pax et al. |
| 10,094,380 B2 | 10/2018 | Doepker et al. |
| 2001/0010800 A1 | 8/2001 | Kohsokabe et al. |
| 2002/0039540 A1 | 4/2002 | Kuroki et al. |
| 2003/0044296 A1 | 3/2003 | Chen |
| 2003/0044297 A1 | 3/2003 | Gennami et al. |
| 2003/0186060 A1 | 10/2003 | Rao |
| 2003/0228235 A1 | 12/2003 | Sowa et al. |
| 2004/0126259 A1 | 7/2004 | Choi et al. |
| 2004/0136854 A1 | 7/2004 | Kimura et al. |
| 2004/0146419 A1 | 7/2004 | Kawaguchi et al. |
| 2004/0170509 A1 | 9/2004 | Wehrenberg et al. |
| 2004/0184932 A1 | 9/2004 | Lifson |
| 2004/0197204 A1 | 10/2004 | Yamanouchi et al. |
| 2005/0019177 A1 | 1/2005 | Shin et al. |
| 2005/0019178 A1 | 1/2005 | Shin et al. |
| 2005/0053507 A1 | 3/2005 | Takeuchi et al. |
| 2005/0069444 A1 | 3/2005 | Peyton |
| 2005/0140232 A1 | 6/2005 | Lee et al. |
| 2005/0201883 A1 | 9/2005 | Clendenin et al. |
| 2005/0214148 A1 | 9/2005 | Ogawa et al. |
| 2006/0099098 A1 | 5/2006 | Lee et al. |
| 2006/0138879 A1 * | 6/2006 | Kusase ............... B60K 7/0007 |
| | | 310/67 R |
| 2006/0198748 A1 | 9/2006 | Grassbaugh et al. |
| 2006/0228243 A1 | 10/2006 | Sun et al. |
| 2006/0233657 A1 | 10/2006 | Bonear et al. |
| 2007/0036661 A1 | 2/2007 | Stover |
| 2007/0110604 A1 | 5/2007 | Peyton |
| 2007/0130973 A1 | 6/2007 | Lifson et al. |
| 2008/0115357 A1 | 5/2008 | Li et al. |
| 2008/0138227 A1 | 6/2008 | Knapke |
| 2008/0159892 A1 | 7/2008 | Huang et al. |
| 2008/0159893 A1 | 7/2008 | Caillat |
| 2008/0196445 A1 | 8/2008 | Lifson et al. |
| 2008/0223057 A1 | 9/2008 | Lifson et al. |
| 2008/0226483 A1 * | 9/2008 | Iwanami ................. F01C 21/10 |
| | | 418/97 |
| 2008/0305270 A1 | 12/2008 | Uhlianuk et al. |
| 2009/0035167 A1 | 2/2009 | Sun |
| 2009/0068048 A1 | 3/2009 | Stover et al. |
| 2009/0071183 A1 | 3/2009 | Stover et al. |
| 2009/0185935 A1 | 7/2009 | Seibel et al. |
| 2009/0191080 A1 | 7/2009 | Ignatiev et al. |
| 2009/0297377 A1 | 12/2009 | Stover et al. |
| 2009/0297378 A1 | 12/2009 | Stover et al. |
| 2009/0297379 A1 | 12/2009 | Stover et al. |
| 2009/0297380 A1 | 12/2009 | Stover et al. |
| 2010/0111741 A1 | 5/2010 | Chikano et al. |
| 2010/0135836 A1 | 6/2010 | Stover et al. |
| 2010/0158731 A1 | 6/2010 | Akei et al. |
| 2010/0209278 A1 | 8/2010 | Tarao et al. |
| 2010/0212311 A1 | 8/2010 | McQuary et al. |
| 2010/0212352 A1 | 8/2010 | Kim et al. |
| 2010/0254841 A1 | 10/2010 | Akei et al. |
| 2010/0300659 A1 | 12/2010 | Stover et al. |
| 2010/0303659 A1 | 12/2010 | Stover et al. |

(56) References Cited

U.S. PATENT DOCUMENTS

| | | | |
|---|---|---|---|
| 2011/0135509 A1 | 6/2011 | Fields et al. |
| 2011/0206548 A1 | 8/2011 | Doepker |
| 2011/0243777 A1 | 10/2011 | Ito et al. |
| 2011/0250085 A1 | 10/2011 | Stover et al. |
| 2011/0293456 A1 | 12/2011 | Seibel et al. |
| 2012/0009076 A1 | 1/2012 | Kim et al. |
| 2012/0107163 A1 | 5/2012 | Monnier et al. |
| 2012/0183422 A1 | 7/2012 | Bahmata |
| 2012/0195781 A1 | 8/2012 | Stover et al. |
| 2013/0078128 A1 | 3/2013 | Akei |
| 2013/0089448 A1 | 4/2013 | Ginies et al. |
| 2013/0094987 A1* | 4/2013 | Yamashita ............ F04C 23/008 418/55.3 |
| 2013/0121857 A1 | 5/2013 | Liang et al. |
| 2013/0302198 A1 | 11/2013 | Ginies et al. |
| 2013/0309118 A1 | 11/2013 | Ginies et al. |
| 2013/0315768 A1 | 11/2013 | Le Coat et al. |
| 2014/0023540 A1 | 1/2014 | Heidecker et al. |
| 2014/0024563 A1 | 1/2014 | Heidecker et al. |
| 2014/0037486 A1 | 2/2014 | Stover et al. |
| 2014/0134030 A1 | 5/2014 | Stover et al. |
| 2014/0134031 A1 | 5/2014 | Doepker et al. |
| 2014/0147294 A1 | 5/2014 | Fargo et al. |
| 2014/0154121 A1 | 6/2014 | Doepker |
| 2014/0154124 A1 | 6/2014 | Doepker et al. |
| 2015/0037184 A1 | 2/2015 | Rood et al. |
| 2015/0086404 A1 | 3/2015 | Kiem et al. |
| 2015/0192121 A1 | 7/2015 | Sung et al. |
| 2015/0330386 A1 | 11/2015 | Doepker |
| 2015/0345493 A1 | 12/2015 | Lochner et al. |
| 2015/0354719 A1 | 12/2015 | van Beek et al. |
| 2016/0025093 A1 | 1/2016 | Doepker |
| 2016/0025094 A1 | 1/2016 | Ignatiev et al. |
| 2016/0047380 A1* | 2/2016 | Kim ................ F04C 18/0215 417/410.5 |
| 2016/0053759 A1* | 2/2016 | Choi ................ F04C 18/0269 418/55.2 |
| 2016/0076543 A1 | 3/2016 | Akei et al. |
| 2016/0115954 A1 | 4/2016 | Doepker et al. |
| 2016/0138879 A1* | 5/2016 | Matsukado ........ B23K 35/0233 165/185 |
| 2016/0201673 A1 | 7/2016 | Perevozchikov et al. |
| 2017/0002817 A1 | 1/2017 | Stover |
| 2017/0002818 A1 | 1/2017 | Stover |
| 2017/0030354 A1 | 2/2017 | Stover |
| 2017/0241417 A1 | 8/2017 | Jin et al. |
| 2017/0268510 A1 | 9/2017 | Stover et al. |
| 2017/0306960 A1 | 10/2017 | Pax et al. |
| 2017/0314558 A1 | 11/2017 | Pax et al. |
| 2017/0342978 A1 | 11/2017 | Doepker |
| 2017/0342983 A1 | 11/2017 | Jin et al. |
| 2017/0342984 A1 | 11/2017 | Jin et al. |
| 2018/0023570 A1 | 1/2018 | Huang et al. |
| 2018/0038369 A1 | 2/2018 | Doepker et al. |
| 2018/0038370 A1 | 2/2018 | Doepker et al. |
| 2018/0066656 A1 | 3/2018 | Perevozchikov et al. |
| 2018/0149155 A1 | 5/2018 | Akei et al. |
| 2018/0223823 A1 | 8/2018 | Ignatiev et al. |
| 2019/0040861 A1 | 2/2019 | Doepker et al. |
| 2019/0101120 A1 | 4/2019 | Perevozchikov et al. |
| 2019/0186491 A1 | 6/2019 | Perevozchikov et al. |
| 2019/0203709 A1* | 7/2019 | Her ...................... F04C 29/047 |
| 2019/0353164 A1 | 11/2019 | Berning et al. |

FOREIGN PATENT DOCUMENTS

| | | | |
|---|---|---|---|
| CN | 1158945 A | 9/1997 |
| CN | 1177681 A | 4/1998 |
| CN | 1177683 A | 4/1998 |
| CN | 1259625 A | 7/2000 |
| CN | 1286358 A | 3/2001 |
| CN | 1289011 A | 3/2001 |
| CN | 1339087 A | 3/2002 |
| CN | 1349053 A | 5/2002 |
| CN | 1382912 A | 12/2002 |
| CN | 1407233 A | 4/2003 |
| CN | 1517553 A | 8/2004 |
| CN | 1680720 A | 10/2005 |
| CN | 1702328 A | 11/2005 |
| CN | 2747381 Y | 12/2005 |
| CN | 1757925 A | 4/2006 |
| CN | 1828022 A | 9/2006 |
| CN | 1854525 A | 11/2006 |
| CN | 1963214 A | 5/2007 |
| CN | 1995756 A | 7/2007 |
| CN | 101358592 A | 2/2009 |
| CN | 101684785 A | 3/2010 |
| CN | 101761479 A | 6/2010 |
| CN | 101806302 A | 8/2010 |
| CN | 101910637 A | 12/2010 |
| CN | 102076963 A | 5/2011 |
| CN | 102089525 A | 6/2011 |
| CN | 102272454 A | 12/2011 |
| CN | 102400915 A | 4/2012 |
| CN | 102422024 A | 4/2012 |
| CN | 102449314 A | 5/2012 |
| CN | 102705234 A | 10/2012 |
| CN | 102762866 A | 10/2012 |
| CN | 202926640 U | 5/2013 |
| CN | 103502644 A | 1/2014 |
| CN | 103671125 A | 3/2014 |
| CN | 203962320 U | 11/2014 |
| CN | 204041454 U | 12/2014 |
| CN | 104838143 A | 8/2015 |
| CN | 105317678 * | 2/2016 |
| CN | 105317678 A | 2/2016 |
| CN | 205533207 U | 8/2016 |
| CN | 205823629 U | 12/2016 |
| CN | 205876712 U | 1/2017 |
| CN | 205876713 U | 1/2017 |
| CN | 205895597 U | 1/2017 |
| CN | 209621603 U | 11/2019 |
| CN | 209654225 U | 11/2019 |
| DE | 3917656 C2 | 11/1995 |
| DE | 102011001394 A1 | 9/2012 |
| EP | 0747598 A2 | 12/1996 |
| EP | 0822335 A2 | 2/1998 |
| EP | 1067289 A2 | 1/2001 |
| EP | 1087142 A2 | 3/2001 |
| EP | 1182353 A1 | 2/2002 |
| EP | 1241417 A1 | 9/2002 |
| EP | 1371851 A2 | 12/2003 |
| EP | 1382854 A2 | 1/2004 |
| EP | 2151577 A1 | 2/2010 |
| EP | 1927755 A3 | 11/2013 |
| FR | 2764347 A1 | 12/1998 |
| GB | 2107829 A | 5/1983 |
| JP | S58214689 A | 12/1983 |
| JP | S60259794 A | 12/1985 |
| JP | S62220789 A | 9/1987 |
| JP | S6385277 A | 4/1988 |
| JP | S63205482 A | 8/1988 |
| JP | H01178789 * | 7/1989 |
| JP | H01178789 A | 7/1989 |
| JP | H0281982 A | 3/1990 |
| JP | H02153282 A | 6/1990 |
| JP | H03081588 A | 4/1991 |
| JP | 03233101 A | 10/1991 |
| JP | H04121478 A | 4/1992 |
| JP | H04272490 A | 9/1992 |
| JP | H0610601 A | 1/1994 |
| JP | H0726618 B2 | 3/1995 |
| JP | H7026618 B2 | 3/1995 |
| JP | H07293456 A | 11/1995 |
| JP | H08247053 A | 9/1996 |
| JP | H8320079 A | 12/1996 |
| JP | H08334094 A | 12/1996 |
| JP | H09177689 A | 7/1997 |
| JP | H11107950 A | 4/1999 |
| JP | H11166490 A | 6/1999 |
| JP | 2951752 B2 | 9/1999 |
| JP | H11324950 A | 11/1999 |
| JP | 2000104684 A | 4/2000 |

(56) References Cited

FOREIGN PATENT DOCUMENTS

| JP | 2000161263 A | 6/2000 | |
|---|---|---|---|
| JP | 2000329078 A | 11/2000 | |
| JP | 2002202074 A | 7/2002 | |
| JP | 2003074481 A | 3/2003 | |
| JP | 2003074482 A | 3/2003 | |
| JP | 2003106258 A | 4/2003 | |
| JP | 2003214365 A | 7/2003 | |
| JP | 2003227479 A | 8/2003 | |
| JP | 2004239070 A | 8/2004 | |
| JP | 2005264827 A | 9/2005 | |
| JP | 2006083754 A | 3/2006 | |
| JP | 2006183474 A | 7/2006 | |
| JP | 2007154761 A | 6/2007 | |
| JP | 2007228683 A | 9/2007 | |
| JP | 2008248775 A | 10/2008 | |
| JP | 2013104305 A | 5/2013 | |
| JP | 2013167215 A | 8/2013 | |
| KR | 1019870000015 | 5/1985 | |
| KR | 870000015 B1 | 1/1987 | |
| KR | 20050027402 A | 3/2005 | |
| KR | 20050095246 A | 9/2005 | |
| KR | 100547323 B1 | 1/2006 | |
| KR | 20100017008 A | 2/2010 | |
| KR | 101192642 B1 | 10/2012 | |
| KR | 20120115581 A | 10/2012 | |
| KR | 20130094646 A | 8/2013 | |
| WO | WO-9515025 A1 * | 6/1995 | ............... H02K 7/14 |
| WO | WO-0073659 A1 | 12/2000 | |
| WO | WO-2007046810 A2 | 4/2007 | |
| WO | WO-2008060525 A1 | 5/2008 | |
| WO | WO-2009017741 A1 | 2/2009 | |
| WO | WO-2009155099 A2 | 12/2009 | |
| WO | WO-2010118140 A2 | 10/2010 | |
| WO | WO-2011106422 A2 | 9/2011 | |
| WO | WO-2012114455 A1 | 8/2012 | |
| WO | WO-2017071641 A1 | 5/2017 | |

OTHER PUBLICATIONS

U.S. Appl. No. 15/831,423, filed Dec. 5, 2017, Kirill M. Ignatiev et al.
Non-Final Office Action for U.S. Appl. No. 11/522,250, dated Aug. 1, 2007.
Notification of the First Office Action received from the Chinese Patent Office dated Mar. 6, 2009 regarding Application No. 200710153687.2, translated by CCPIT Patent and Trademark Law Office.
Non-Final Office Action for U.S. Appl. No. 12/103,265, dated May 27, 2009.
Non-Final Office Action for U.S. Appl. No. 12/103,265, dated Dec. 17, 2009.
Notice of Grounds for Rejection regarding Korean Patent Application No. 10-2007-0093478 dated Feb. 25, 2010. Translation provided by Y.S. Chang & Associates.
Final Office Action for U.S. Appl. No. 12/103,265, dated Jun. 15, 2010.
Final Preliminary Notice of Grounds for Rejection regarding Korean Patent Application No. 10-2007-0093478, dated Aug. 31, 2010. Translation provided by Y.S. Chang & Associates.
Advisory Action for U.S. Appl. No. 12/103,265, dated Sep. 17, 2010.
First Office Action regarding Chinese Patent Application No. 201010224582.3, dated Apr. 17, 2012. English translation provided by Unitalen Attorneys at Law.
First Examination Report regarding India-Patent Application No. 1071/KOL/2007, dated Apr. 27, 2012.
Non-Final Office Action for U.S. Appl. No. 13/0365,529, dated Aug. 22, 2012.
International Search Report regarding International Application No. PCT/US2017/050525, dated Dec. 28, 2017.
Written Opinion of the International Searching Authority regarding International Application No. PCT/US2017/050525, dated Dec. 28, 2017.
Non-Final Office Action for U.S. Appl. No. 14/809,786, dated Jan. 11, 2018.
Office Action regarding Chinese Patent Application No. 201180010366.1, dated Jun. 4, 2014. Translation provided by Unitalen Attorneys at Law.
Office Action regarding Chinese Patent Application No. 201610516097.0, dated Jun. 27, 2017. Translation provided by Unitalen Attorneys at Law.
Notice of Allowance regarding U.S. Appl. No. 15/186,092, dated Dec. 20, 2018.
Office Action regarding Indian Patent Application No. 1306/MUMNP/2015, dated Dec. 31, 2018.
Notice of Allowance regarding U.S. Appl. No. 15/187,225, dated Jan. 3, 2019.
Office Action regarding Chinese Patent Application No. 201610499158.7, dated Feb. 1, 2019. Translation provided by Unitalen Attorneys at Law.
Notice of Allowance regarding U.S. Appl. No. 15/784,458, dated Feb. 7, 2019.
Notice of Allowance regarding U.S. Appl. No. 15/784,540, dated Feb. 7, 2019.
Search Report regarding European Patent Application No. 18198310.7, dated Feb. 27, 2019.
Notice of Allowance regarding U.S. Appl. No. 15/186,151, dated Mar. 19, 2019.
Notice of Allowance regarding U.S. Appl. No. 15/186,092, dated Apr. 19, 2019.
Office Action regarding Chinese Patent Application No. 201710795228.8, dated Apr. 29, 2019. Translation provided by Unitalen Attorneys at Law.
Notice of Allowance regarding U.S. Appl. No. 15/187,225, dated May 2, 2019.
Office Action regarding U.S. Appl. No. 15/587,735, dated May 17, 2019.
Office Action regarding Chinese Patent Application No. 201811011292.3, dated Jun. 21, 2019. Translation provided by Unitalen Attorneys at Law.
Office Action regarding European Patent Application No. 11747996.4, dated Jun. 26, 2019.
Notice of Allowance regarding U.S. Appl. No. 15/186,151, dated Jul. 25, 2019.
Office Action regarding Chinese Patent Application No. 201610499158.7, dated Aug. 1, 2019. Translation provided by Unitalen Attorneys at Law.
Office Action regarding Chinese Patent Application No. 201811168307.7, dated Aug. 12, 2019. Translation provided by Unitalen Attorneys at Law.
Notice of Allowance regarding U.S. Appl. No. 15/587,735, dated Aug. 23, 2019.
International Search Report regarding International Application No. PCT/US2019/032718, dated Aug. 23, 2019.
Written Opinion of the International Searching Authority regarding International Application No. PCT/US2019/032718, dated Aug. 23, 2019.
Office Action regarding Chinese Patent Application No. 201780055443.2, dated Sep. 2, 2019. Translation provided by Unitalen Attorneys at Law.
Office Action regarding U.S. Appl. No. 15/692,844, dated Sep. 20, 2019.
U.S. Appl. No. 15/186,092, filed Jun. 17, 2016, Robert C. Stover.
U.S. Appl. No. 15/186,151, filed Jun. 17, 2016, Robert C. Stover.
U.S. Appl. No. 15/187,225, filed Jun. 20, 2016, Robert C. Stover.
U.S. Appl. No. 15/187,735, filed May 5, 2017, Robert C. Stover et al.
U.S. Appl. No. 15/784,458, filed Oct. 16, 2017, Roy J. Doepker et al.
U.S. Appl. No. 15/784,540, filed Oct. 16, 2017, Roy J. Doepker et al.
U.S. Appl. No. 15/881,016, filed Jan. 26, 2018, Masao Akei et al.

(56) References Cited

OTHER PUBLICATIONS

U.S. Appl. No. 16/147,920, filed Oct. 1, 2018, Michael M. Perevozchikov et al.
U.S. Appl. No. 16/154,406, filed Oct. 8, 2018, Roy J. Doepker et al.
U.S. Appl. No. 16/154,844, filed Oct. 9, 2018, Jeffrey Lee Berning et al.
U.S. Appl. No. 16/177,902, filed Nov. 1, 2018, Michael M. Perevozchikov et al.
Luckevich, Mark, "MEMS microvalves: the new valve world." Valve World, May 2007, pp. 79-83.
Extended European Search Report regarding Application No. EP07254962, dated Mar. 12, 2008.
U.S. Office Action regarding U.S. Appl. No. 11/645,288, dated Nov. 30, 2009.
First China Office Action regarding Application No. 200710160038.5, dated Jul. 8, 2010. Translation provided by Unitalen Attorneys At Law.
International Search Report regarding Application No. PCT/US2010/030248, dated Nov. 26, 2010.
Written Opinion of the International Searching Authority regarding Application No. PCT/US2010/030248, dated Nov. 26, 2010.
International Search Report regarding Application No. PCT/US2011/025921, dated Oct. 7, 2011.
Written Opinion of the International Search Authority regarding Application No. PCT/US2011/025921, dated Oct. 7, 2011.
China Office Action regarding Application No. 200710160038.5, dated Jan. 31, 2012. Translation provided by Unitalen Attorneys At Law.
U.S. Office Action regarding U.S. Appl. No. 13/181,065, dated Nov. 9, 2012.
International Search Report regarding Application No. PCT/US2013/051678, dated Oct. 21, 2013.
Written Opinion of the International Searching Authority regarding Application No. PCT/US2013/051678, dated Oct. 21, 2013.
China Office Action regarding Application No. 201080020243.1, dated Nov. 5, 2013. Translation provided by Unitalen Attorneys At Law.
International Search Report regarding Application No. PCT/US2013/069456, dated Feb. 18, 2014.
Written Opinion of the International Searching Authority regarding Application No. PCT/US2013/069456, dated Feb. 18, 2014.
International Search Report regarding Application No. PCT/US2013/069462, dated Feb. 21, 2014.
Written Opinion of the International Searching Authority regarding Application No. PCT/US2013/069462, dated Feb. 21, 2014.
International Search Report regarding Application No. PCT/US2013/070992, dated Feb. 25, 2014.
Written Opinion of the International Searching Authority regarding Application No. PCT/US2013/070992, dated Feb. 25, 2014.
International Search Report regarding Application No. PCT/US2013/070981, dated Mar. 4, 2014.
Written Opinion of the International Searching Authority regarding Application No. PCT/US2013/070981, dated Mar. 4, 2014.
Second Office Action regarding China Application No. 201180010366.1, dated Dec. 31, 2014. Translation provided by Unitalen Attorneys At Law.
Office Action regarding U.S. Appl. No. 14/081,390, dated Mar. 27, 2015.
Search Report regarding European Patent Application No. 10762374.6-1608 / 2417356 PCT/US2010030248, dated Jun. 16, 2015.
Office Action regarding U.S. Appl. No. 14/060,240, dated Aug. 12, 2015.
International Search Report regarding International Application No. PCT/US2015/033960, dated Sep. 1, 2015.
Written Opinion of the International Searching Authority regarding International Application No. PCT/US2015/033960, dated Sep. 1, 2015.
Office Action regarding U.S. Appl. No. 14/073,293, dated Sep. 25, 2015.
Restriction Requirement regarding U.S. Appl. No. 14/060,102, dated Oct. 7, 2015.
Office Action regarding Chinese Patent Application No. 201410461048.2, dated Nov. 30, 2015. Translation provided by Unitalen Attorneys at Law.
Interview Summary regarding U.S. Appl. No. 14/060,240, dated Dec. 1, 2015.
Office Action regarding U.S. Appl. No. 14/073,293, dated Jan. 29, 2016.
Office Action regarding Chinese Patent Application No. 201410460792.0, dated Feb. 25, 2016. Translation provided by Unitalen Attorneys at Law.
Restriction Requirement regarding U.S. Appl. No. 14/060,102, dated Mar. 16, 2016.
First Office Action regarding Chinese Application No. 201380059666.8, dated Apr. 5, 2016. Translation provided by Unitalen Attorneys At Law.
First Office Action regarding Chinese Application No. 201380062614.6, dated Apr. 5, 2016. Translation provided by Unitalen Attorneys At Law.
Advisory Action regarding U.S. Appl. No. 14/073,293, dated Apr. 18, 2016.
Office Action regarding Chinese Patent Application No. 201380062657.4, dated May 4, 2016. Translation provided by Unitalen Attorneys at Law.
Office Action regarding Chinese Patent Application No. 201380059963.2, dated May 10, 2016. Translation provided by Unitalen Attorneys at Law.
Office Action regarding U.S. Appl. No. 14/060,102, dated Jun. 14, 2016.
Office Action regarding U.S. Appl. No. 14/846,877, dated Jul. 15, 2016.
Office Action regarding Chinese Patent Application No. 201410461048.2, dated Jul. 26, 2016. Translation provided by Unitalen Attorneys at Law.
Search Report regarding European Patent Application No. 13858194.7, dated Aug. 3, 2016.
Search Report regarding European Patent Application No. 13859308.2, dated Aug. 3, 2016.
Office Action regarding U.S. Appl. No. 14/294,458, dated Aug. 19, 2016.
Office Action regarding Chinese Patent Application No. 201410460792.0, dated Oct. 21, 2016. Translation provided by Unitalen Attorneys At Law.
Search Report regarding European Patent Application No. 11747996.4, dated Nov. 7, 2016.
Office Action regarding Chinese Patent Application No. 201380059666.8, dated Nov. 23, 2016. Translation provided by Unitalen Attorneys at Law.
Office Action regarding U.S. Appl. No. 14/060,102, dated Dec. 28, 2016.
International Search Report regarding International Application No. PCT/CN2016/103763, dated Jan. 25, 2017.
Written Opinion of the International Searching Authority regarding International Application No. PCT/CN2016/103763, dated Jan. 25, 2017.
Office Action regarding U.S. Appl. No. 15/156,400, dated Feb. 23, 2017.
Office Action regarding U.S. Appl. No. 14/294,458, dated Feb. 28, 2017.
Advisory Action regarding U.S. Appl. No. 14/060,102, dated Mar. 3, 2017.
Office Action regarding U.S. Appl. No. 14/663,073, dated Apr. 11, 2017.
Office Action regarding Chinese Patent Application No. 201410460792.0, dated Apr. 24, 2017. Translation provided by Unitalen Attorneys at Law.
Office Action regarding U.S. Appl. No. 14/946,824, dated May 10, 2017.
Advisory Action regarding U.S. Appl. No. 14/294,458, dated Jun. 9, 2017.

(56) References Cited

OTHER PUBLICATIONS

Office Action regarding Chinese Patent Application No. 201610703191.7, dated Jun. 13, 2017. Translation provided by Unitalen Attorneys at Law.
Office Action regarding Indian Patent Application No. 2043/MUMNP/2011, dated Jul. 28, 2017.
Office Action regarding U.S. Appl. No. 14/294,458, dated Sep. 21, 2017.
Office Action regarding U.S. Appl. No. 14/757,407, dated Oct. 13, 2017.
Office Action regarding Chinese Patent Application No. 201610158216.X, dated Oct. 30, 2017. Translation provided by Unitalen Attorneys at Law.
Office Action regarding Chinese Patent Application No. 201410460792.0, dated Nov. 1, 2017. Translation provided by Unitalen Attorneys At Law.
Office Action regarding Chinese Patent Application No. 201610512702.7, dated Dec. 20, 2017. Partial translation provided by Unitalen Attorneys at Law.
Office Action regarding Chinese Patent Application No. 201610499158.7, dated Jan. 9, 2018. Translation provided by Unitalen Attorneys at Law.
Office Action regarding Chinese Patent Application No. 201580029636.1, dated Jan. 17, 2018. Translation provided by Unitalen Attorneys at Law.
Office Action regarding U.S. Appl. No. 15/646,654, dated Feb. 9, 2018.
Office Action regarding U.S. Appl. No. 15/651,471 dated Feb. 23, 2018.
Office Action regarding Indian Patent Application No. 1907/MUMNP/2012, dated Feb. 26, 2018.
Election Requirement regarding U.S. Appl. No. 15/186,092, dated Apr. 3, 2018.
Election Requirement regarding U.S. Appl. No. 15/784,458, dated Apr. 5, 2018.
Office Action regarding Korean Patent Application No. 10-2016-7034539, dated Apr. 11, 2018. Translation provided by Y.S. Chang & Associates.
Office Action regarding U.S. Appl. No. 15/186,151, dated May 3, 2018.
Office Action regarding Chinese Patent Application No. 201610930347.5, dated May 14, 2018. Translation provided by Unitalen Attorneys at Law.
Election/Restriction Requirement regarding U.S. Appl. No. 15/187,225, dated May 15, 2018.
Notice of Allowance regarding U.S. Appl. No. 14/757,407, dated May 24, 2018.
Office Action regarding Chinese Patent Application No. 201610158216.X, dated Jun. 13, 2018. Translation provided by Unitalen Attorneys at Law.
Office Action regarding European Patent Application No. 13859308.2, dated Jun. 22, 2018.
Office Action regarding U.S. Appl. No. 15/186,092, dated Jun. 29, 2018.
Notice of Allowance regarding U.S. Appl. No. 15/646,654, dated Jul. 11, 2018.
Notice of Allowance regarding U.S. Appl. No. 15/651,471, dated Jul. 11, 2018.
Office Action regarding U.S. Appl. No. 15/784,540, dated Jul. 17, 2018.
Office Action regarding U.S. Appl. No. 15/784,458, dated Jul. 19, 2018.
Election/Restriction Requirement regarding U.S. Appl. No. 15/587,735, dated Jul. 23, 2018.
Office Action regarding Chinese Patent Application No. 201610499158.7, dated Aug. 1, 2018. Translation provided by Unitalen Attorneys at Law.
Applicant-Initiated Interview Summary regarding U.S. Appl. No. 15/186,092, dated Aug. 14, 2018.
Office Action regarding U.S. Appl. No. 15/187,225, dated Aug. 27, 2018.
Office Action regarding Chinese Patent Application No. 201710795228.8, dated Sep. 5, 2018. Translation provided by Unitalen Attorneys at Law.
Office Action regarding Korean Patent Application No. 10-2016-7034539, dated Sep. 6, 2018. Translation provided by Y.S. Chang & Associates.
Office Action regarding Indian Patent Application No. 1307/MUMNP/2015, dated Sep. 12, 2018.
Office Action regarding Chinese Patent Application No. 201580029636.1, dated Oct. 8, 2018. Translation provided by Unitalen Attorneys at Law.
Office Action regarding U.S. Appl. No. 15/587,735, dated Oct. 9, 2018.
Office Action regarding U.S. Appl. No. 15/186,151, dated Nov. 1, 2018.
Office Action regarding Korean Patent Application No. 10-2017-7033995, dated Nov. 29, 2018. Translation provided by KS KORYO International IP Law Firm.
U.S. Appl. No. 14/809,786, filed Jul. 27, 2015, Kirill M. Ignatiev et al.
International Search Report regarding International Application No. PCT/US2015/042479, dated Oct. 23, 2015.
Written Opinion of the International Searching Authority regarding International Application No. PCT/US2015/042479, dated Oct. 23, 2015.
Restriction Requirement regarding U.S. Appl. No. 14/809,786, dated Aug. 16, 2017.
Office Action regarding Chinese Patent Application No. 201580041209.5, dated Jan. 17, 2018. Translation provided by Unitalen Attorneys at Law.
Office Action regarding Chinese Patent Application No. 201710795228.8, dated Oct. 28, 2019. Translation provided by Unitalen Attorneys at Law.
Office Action regarding European Patent Application No. 11747996.4, dated Nov. 5, 2019.
Notice of Allowance regarding U.S. Appl. No. 15/186,151, dated Nov. 14, 2019.
Office Action regarding Indian Patent Application No. 2043/MUMNP/2011, dated Nov. 27, 2019.
Office Action regarding Chinese Patent Application No. 201811480347.5, dated Jan. 10, 2020. Translation provided by Unitalen Attorneys at Law.
Office Action regarding Chinese Patent Application No. 201811541653.5, dated Jan. 10, 2020. Translation provided by Unitalen Attorneys at Law.
Office Action regarding European Patent Application No. 11747996.4, dated Jan. 14, 2020.
Office Action regarding U.S. Appl. No. 15/881,016, dated Jan. 23, 2020.
Office Action regarding U.S. Appl. No. 15/831,423, dated Jan. 31, 2020.
Notice of Allowance regarding U.S. Appl. No. 15/692,844, dated Feb. 20, 2020.
Office Action regarding European Patent Application No. 13859308.2, dated Mar. 4, 2020.
Office Action regarding Chinese Patent Application No. 201811168307.7, dated Mar. 27, 2020. Translation provided by Unitalen Attorneys at Law.

* cited by examiner

COMPRESSOR

CROSS-REFERENCE TO RELATED APPLICATIONS

This application claims the benefit of U.S. Provisional Application No. 62/455,679, filed on Feb. 7, 2017 and U.S. Provisional Application No. 62/384,976, filed on Sep. 8, 2016. The entire disclosures of each of the above applications are incorporated herein by reference.

FIELD

The present disclosure relates to a compressor for a climate control system.

BACKGROUND

This section provides background information related to the present disclosure and is not necessarily prior art.

A compressor may be used in a refrigeration, heat pump, HVAC, or chiller system (generically, "climate control system") to circulate a working fluid therethrough. The compressor may be one of a variety of compressor types. For example, the compressor may be a scroll compressor, a rotary-vane compressor, a reciprocating compressor, a centrifugal compressor, or an axial compressor. During operation of the compressor, a motor assembly may be used to rotate a driveshaft. In this regard, compressors often utilize a motor assembly that includes a stator surrounding a central rotor that is coupled to the driveshaft. Regardless of the exact type of compressor employed, consistent and reliable construction and assembly of the motor assembly is desirable to ensure that the compressor can effectively and efficiently circulate the working fluid through the climate control system.

SUMMARY

This section provides a general summary of the disclosure, and is not a comprehensive disclosure of its full scope or all of its features.

The present disclosure provides a compressor that may include a shell, a compression mechanism, a driveshaft, a motor assembly, and a stator support member. The compression mechanism is disposed within the shell. The driveshaft is drivingly engaged with the compression mechanism. The motor assembly may be disposed within the shell and is drivingly engaged with the driveshaft. The motor assembly includes a rotor and a stator. The stator is fixed relative to the shell. The rotor may include an axially extending portion and a radially extending portion. The axially extending portion may be disposed radially outward relative to the stator. The radially extending portion may engage the driveshaft and may be disposed axially between the stator and the compression mechanism. The stator support member may be fixed relative to the shell and the stator. The stator support member may extend longitudinally through at least a portion of the stator.

In some configurations, the compressor includes a bearing housing rotatably supporting the driveshaft, wherein the radially extending portion of the rotor is disposed axially between the stator and the bearing housing.

In some configurations, the stator support member is axially spaced apart from the driveshaft.

In some configurations, the radially extending portion of the rotor is attached to a first axial end of the driveshaft.

In some configurations, a second axial end of the driveshaft drivingly engages the compression mechanism.

In some configurations, the driveshaft includes an eccentric portion disposed axially between the first axial end of the driveshaft and a second axial end of the driveshaft.

In some configurations, the stator support member includes a tubular portion that engages the stator and includes a first fluid passageway extending therethrough.

In some configurations, the stator support member includes a flange portion disposed at an axial end of the tubular portion and extending radially outward from the tubular portion.

In some configurations, the flange portion includes a second fluid passageway extending therethrough.

In some configurations, the stator support member includes an aperture, and one or more wires connected to the stator extend through the aperture.

In some configurations, the stator support member is integrally formed with the shell.

In some configurations, the radially extending portion of the rotor includes at least one fluid passageway extending therethrough and is disposed radially between the driveshaft and the axially extending portion of the rotor.

In some configurations, the axially extending portion of the rotor includes a first axial end and a second axial end. The radially extending portion of the rotor may extend from the first axial end, and the second axial end may be unsupported by the stator and the shell.

In some configurations, an outer diametrical surface of the axially extending portion of the rotor includes a plurality of fins fixed thereto.

In some configurations, the driveshaft includes a fluid passageway in fluid communication with a discharge chamber defined by said shell.

In some configurations, the compression mechanism includes an orbiting scroll member and a non-orbiting scroll member. The non-orbiting scroll member may include a first discharge passage in fluid communication with the discharge chamber. The orbiting scroll member may include a second discharge passage in fluid communication with the fluid passageway in the driveshaft.

The present disclosure also provides a compressor that may include a shell, a compression mechanism, a driveshaft, a bearing housing, a motor assembly, and a stator support member. The compression mechanism is disposed within the shell. The driveshaft is drivingly engaged with the compression mechanism. The bearing housing rotatably supports the driveshaft. The motor assembly may be disposed within the shell and is drivingly engaged with the driveshaft. The motor assembly may include a rotor and a stator. The stator is fixed relative to the shell. The rotor may have a U-shaped cross section including an axially extending portion and a radially extending portion. The axially extending portion may be disposed radially outward relative to the stator. The radially extending portion may engage the driveshaft and may be disposed axially between the stator and the bearing housing. The stator support member may be fixed relative to the shell and the stator. The stator support member may extend longitudinally through at least a portion of the stator.

The present disclosure also provides a compressor that may include a shell, a compression mechanism, a driveshaft, and a bearing housing. The compression mechanism is disposed within the shell. The driveshaft is drivingly engaged with the compression mechanism. The driveshaft may be rotatably supported only by a single bearing. The bearing housing may be fixed relative to the shell and supports the single bearing rotatably supporting the driveshaft.

In some configurations, the compressor includes a motor assembly disposed within the shell and drivingly engaged with the driveshaft. The motor assembly may include a rotor and a stator. The stator may be fixed relative to the shell. The rotor may include an axially extending portion and a radially extending portion. The axially extending portion may be disposed radially outward relative to the stator. The radially extending portion may engage the driveshaft and may be disposed axially between the stator and the compression mechanism.

In some configurations, the compressor includes a stator support member fixed relative to the shell and the stator. The stator support member may extend longitudinally through at least a portion of the stator.

In some configurations, the driveshaft is axially spaced apart from a tubular portion of the stator support member.

In some configurations, the radially extending portion of the rotor is attached to a first axial end of the driveshaft.

In some configurations, a second axial end of the driveshaft drivingly engages the compression mechanism.

In some configurations, the driveshaft extends through the shell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
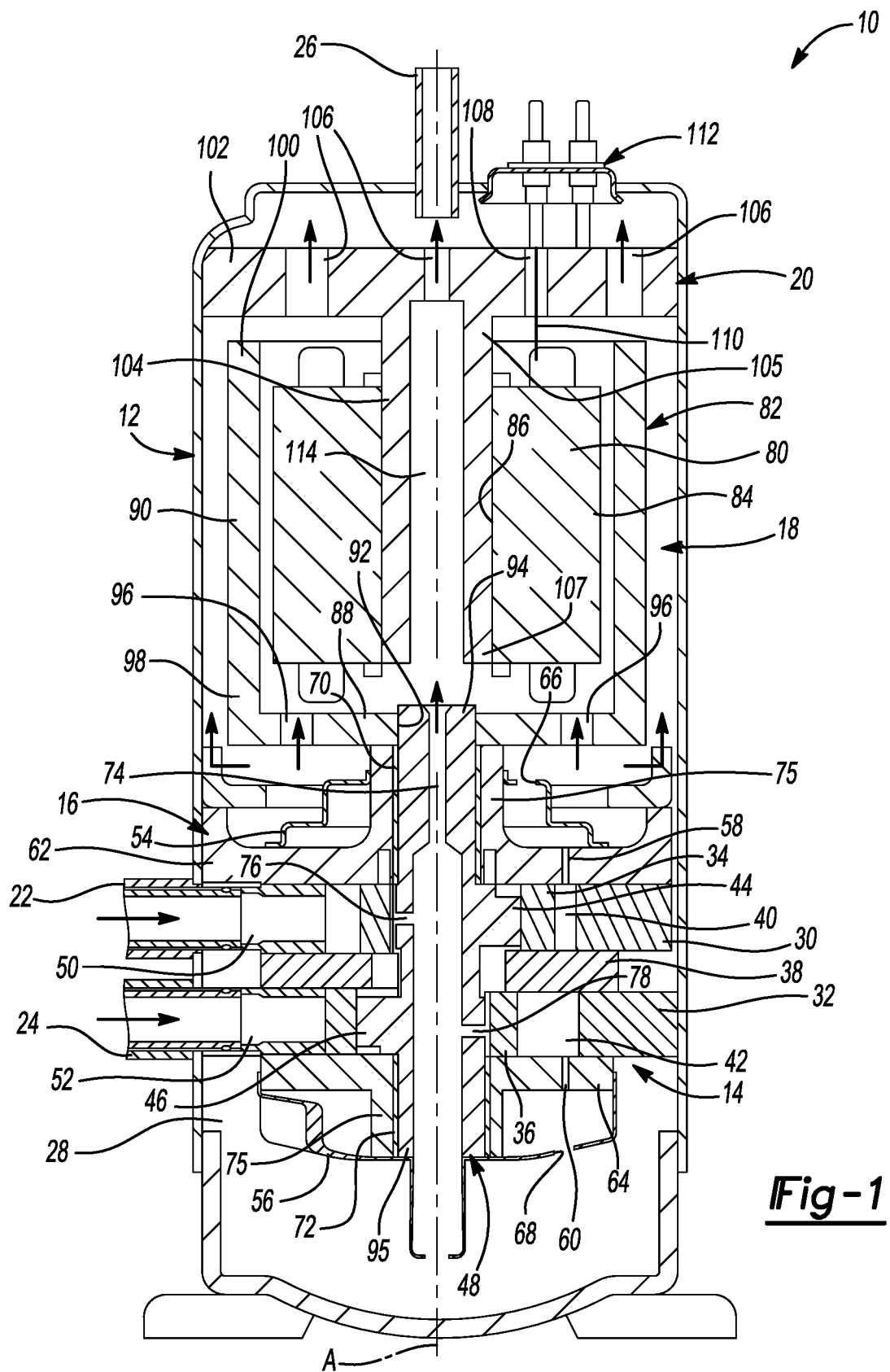
FIG. 1 is a cross-sectional view of a compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a compressor 10 is provided that may include a shell 12, a compression mechanism 14, a bearing housing assembly 16, a motor assembly 18, and a stator support member 20. While the compressor 10 shown in FIG. 1 is a rotary-vane compressor, the principles of the present disclosure are suitable for incorporation in many different types of compressors, including hermetic compressors, non-hermetic compressors, open drive compressors, low-side compressors (i.e., where the motor assembly 18 is disposed in a suction-pressure chamber of the shell 12), and high-side compressors (i.e., where the motor assembly 18 is disposed in a discharge-pressure chamber of the shell 12). Furthermore, while FIG. 1 depicts the motor assembly 18 being vertically above the compression mechanism 14 and bearing housing assembly 16, in some configurations, the motor assembly 18 could be disposed vertically below the compression mechanism 14 and bearing housing assembly 16. In other configurations, the compressor 10 could be a horizontal compressor.

The shell 12 may house the compression mechanism 14, the bearing housing assembly 16, the motor assembly 18, and the stator support member 20. The shell 12 may include first and second suction inlet ports 22, 24 receiving a working fluid at a suction pressure from one of an indoor and outdoor heat exchanger (not shown) of a climate control system and a discharge outlet port 26 discharging the working fluid to the other of the indoor and outdoor heat exchanger after it has been compressed by the compression mechanism 14. The shell 12 defines a discharge chamber 28 (containing discharge-pressure fluid) in which the compression mechanism 14, the bearing housing assembly 16, the motor assembly 18, and the stator support member 20 are disposed.

The compression mechanism 14 may include a first cylinder housing 30, a second cylinder housing 32, a first rotor 34, a second rotor 36, and a divider plate 38. The first and second cylinder housings 30, 32 may be fixed relative to the shell 12 and may include first and second cylindrical recesses 40, 42, respectively. The first cylinder housing 30 may be disposed between the bearing housing assembly 16 and the divider plate 38. The divider plate 38 may be disposed between the first cylinder housing 30 and the second cylinder housing 32. The first and second rotors 34, 36 may be disposed within the first and second cylindrical recesses 40, 42, respectively, and may engage first and second eccentric portions 44, 46, respectively, of a driveshaft 48. Accordingly, rotation of the driveshaft 48 about a rotational axis A causes the first and second rotors 34, 36 to rotate in an orbital path within the first and second cylindrical recesses 40, 42.

Each of the first and second cylinder housings 30, 32 may reciprocatingly receive a vane (not shown). The vanes may extend radially into the first and second cylindrical recesses 40, 42 and may be spring-biased into contact with a radially outer circumferential surface of the rotors 34, 36. The vanes may reciprocate relative to the cylinder housings 30, 32 as the rotors 34, 36 rotate within the cylindrical recesses 40, 42. The vanes may separate a suction-pressure chamber from a compression chamber within each of the first and second cylindrical recesses 40, 42 between the outer circumferential surface of each rotor 34, 36 and an inner diametrical surface of each cylindrical recess 40, 42.

Suction openings 50, 52 may be formed in the cylinder housings 30, 32 and provide fluid communication between the suction inlet ports 22, 24 and the suction-pressure chambers within the first and second cylindrical recesses 40, 42. Working fluid may be compressed in the compression chambers of the first and second cylindrical recesses 40, 42 and discharged into corresponding discharge mufflers 54, 56 through discharge openings 58, 60 formed in upper and lower bearing housings 62, 64 of the bearing housing assembly 16. Discharge valves (not shown) may restrict or prevent working fluid in the discharge mufflers 54, 56 from flowing back into the compression chambers. From the discharge mufflers 54, 56, discharge-pressure working fluid may flow through outlets 66, 68 in the discharge mufflers 54, 56 and into the discharge chamber 28 and may flow around and/or through various components within the discharge chamber 28 (as will be subsequently described) before exiting the compressor 10 through the discharge outlet port 26.

The driveshaft 48 may include an axially extending fluid passageway 74 that extends axially (i.e., along the rotational axis A) through the length of the driveshaft 48. The fluid passageway 74 may be in fluid communication with the discharge chamber 28 and first and second radial passageways 76, 78 that are aligned with the first and second rotors 34, 36. In this manner, discharge gas and lubricant entrained in the discharge gas can flow from the discharge chamber 28 to the fluid passageway 74 and through the first and second radial passageways 76, 78 to lubricate the first and second rotors 34, 36 and bearings 70, 72. In some configurations, a bottom portion of the shell 12 may define a lubricant sump from which lubricant can be drawn into the fluid passageway 74 and distributed to various compressor components.

The bearing housing assembly 16 may include the upper and lower bearing housings 62, 64 and upper and lower bearings 70, 72. The first cylinder housing 30 may be sandwiched between the upper bearing housing 62 and the divider plate 38. The second cylinder housing 32 may be sandwiched between the lower bearing housing 62 and the divider plate 38. The bearing housings 62, 64 may be fixed relative to the shell 12 and may each include a generally tubular portion 75 that receive the bearings 70, 72 and the driveshaft 48. In this manner, the bearing housings 62, 64 and the bearings 70, 72 rotatably support the driveshaft 48.

The motor assembly 18 may include a stator 80 and a rotor 82. The motor assembly 18 can be a fixed-speed motor or a variable-speed motor. In some configurations, the motor assembly 18 may be an induction motor. In other configurations, the motor assembly 18 may be a switched reluctance motor. In other configurations, the stator 80 may be of a segmented stator design where the segments of the stator 80 may interlock to help prevent the stator 80 from disassembling during assembly and operation of the compressor 10. In this regard, in some configurations, the stator 80 may include a plurality of wire-wound poles 84. The poles 84 may define an axially extending aperture 86 therethrough. The aperture 86 may receive the stator support member 20 such that the stator 80 is fixed to the stator support member 20, as will be described in more detail below.

The rotor 82 may be disposed about the stator 80 and coupled to the driveshaft 48. In this regard, the rotor 82 may transmit rotational power to the driveshaft 48. The rotor 82 may include a radially extending portion 88 and an axially extending portion 90 that cooperate to form a U-shaped cross section. The radially extending portion 88 may be a generally disk-shaped member and may be disposed between an axial end of the stator 80 and the upper bearing housing 62. The radially extending portion 88 may include a central aperture 92 that receives the driveshaft 48 at or proximate a first axial end 94 of the driveshaft 48. The rotor 82 may be fixed relative to the driveshaft 48 by press fitting the driveshaft 48 within the central aperture 92. One or more additional or alternative means for fixing the driveshaft 48 to the radially extending portion 88 could be employed, such as threaded engagement, adhesive bonding and/or fasteners, for example. The radially extending portion 88 may also include one or more fluid passageways 96 disposed radially between the central aperture 92 and the axially extending portion 90. The fluid passageways 96 and space between the shell 12 and the axially extending portion 90 of the rotor 82 may facilitate the flow of discharge gas and lubricant entrained in the discharge gas throughout the discharge chamber 28 to lubricate and cool various compressor components such as the stator 80, rotor 82, driveshaft 48, bearings 70, 72 and the rotors 34, 36 of the compression mechanism 14.

The axially extending portion 90 of the rotor 82 may be a generally tubular member and may include a first axial end 98 and a second axial end 100. The radially extending portion 88 may extend radially inward from the first axial end 98. In some configurations, the second axial end 100 is unsupported by the shell 12, the compression mechanism 14, the bearing housing assembly 16, the stator support member 20 or any other structure. The axially extending portion 90 is disposed radially outward relative to the stator 80 (i.e., radially between the stator 80 and the shell 12).

The stator support member 20 may be fixed relative to the shell 12 and the stator 80 and may include a flange portion 102 and a tubular portion 104. A radially outer periphery of the flange portion 102 may be fixedly attached to the shell 12 via welding, staking, fasteners and/or any other means. In some configurations, the flange portion 102 may be integrally formed with the shell 12 (e.g., the flange portion 102 could be an end cap of the shell 12 or integrally formed with an end cap of the shell 12). The flange portion 102 may include one or more fluid passageways 106 extending therethrough that facilitate the flow of discharge gas throughout the discharge chamber 28 and into the discharge outlet port 26. The flange portion 102 may also include one or more wire apertures 108. Wires 110 connected to the stator 80 may extend through the wire aperture 108 to a terminal assembly 112 attached to the shell 12 for electrical connection to a source of electrical power and a compression control system (not shown). In some configurations, the wire aperture 108 may be a fluid passageway (e.g., like the fluid passageways 106) through which discharge gas may flow.

The tubular portion 104 may be integrally formed with and extend axially from the flange portion 102. That is, the flange portion 102 and the tubular portion 104 may be attached or integrally formed at a first axial end 105 of the tubular portion 104. A longitudinal axis of the tubular portion 104 may be coincident with the rotational axis A of the driveshaft 48. The tubular portion 104 may be axially spaced apart from the driveshaft 48 along the rotational axis A such that a second axial end 107 of the tubular portion 104 is disposed axially between the first axial end 105 and the first axial end 94 of the driveshaft 48 (i.e., in an axial direction along the rotational axis A). The first axial end 94 of the driveshaft 48 is disposed axially between a second axial end 95 of the driveshaft 48 and the second axial end 107 of the tubular portion 104. In the configuration shown in FIG. 1, the driveshaft 48 is not supported by the stator support member 20. One of the fluid passageways 106 in the flange portion 102 may be in fluid communication with an inner volume 114 of the tubular portion 104.

The tubular portion 104 may extend longitudinally through at least a portion of the aperture 86 of the stator 80 such that the stator 80 is fixedly attached to the tubular portion 104. That is, the stator 80 is disposed radially between the tubular portion 104 and the axially extending portion 90 of the rotor 82. In some configurations, the stator 80 may be press-fit over the tubular portion 104. In other configurations, the aperture 92 may include one or more slots or protrusions (not shown) sized to receive corresponding protrusions or slots (not shown) of the tubular portion 104. It will be appreciated that the stator 80 may be fixedly secured to the tubular portion 104 using other means such as threaded engagement, fasteners and/or adhesive bonding.

The structure of the motor assembly 18 and stator support member 20 provides several advantages. For example, positioning the rotor 82 such that the radially extending portion 88 is disposed axially between the stator 80 and the bearing housing 62 and attaching the radially extending portion 88 to the driveshaft 48 allows the length of the driveshaft 48 to be substantially reduced. The shorter length of the driveshaft 48 results in increased driveshaft stiffness and reduces vibration during operation of the compressor 10, as a shorter and stiffer driveshaft is easier to rotationally balance within a compressor than a longer and less stiff driveshaft. By having the tubular portion 104 axially spaced apart from the driveshaft 48 along the rotational axis A, a flow path is created that may facilitate the flow of discharge gas and lubricant entrained in the discharge gas from the passageway 74 to the space between the stator 80 and the rotor 82, as well as through the inner volume 114 in the stator support member 20, to help cool the stator 80 and rotor 82. Furthermore, the positioning of an open end (i.e., at the second axial end 100) of the U-shaped rotor 82 facing toward the terminal assembly 112 and away from the bearing housing assembly 16 and the compression mechanism 14 allows the wires 110 to be more easily routed between the stator 80 and the terminal assembly 112, thereby making assembly of the compressor 10 simpler.

Figure 2:
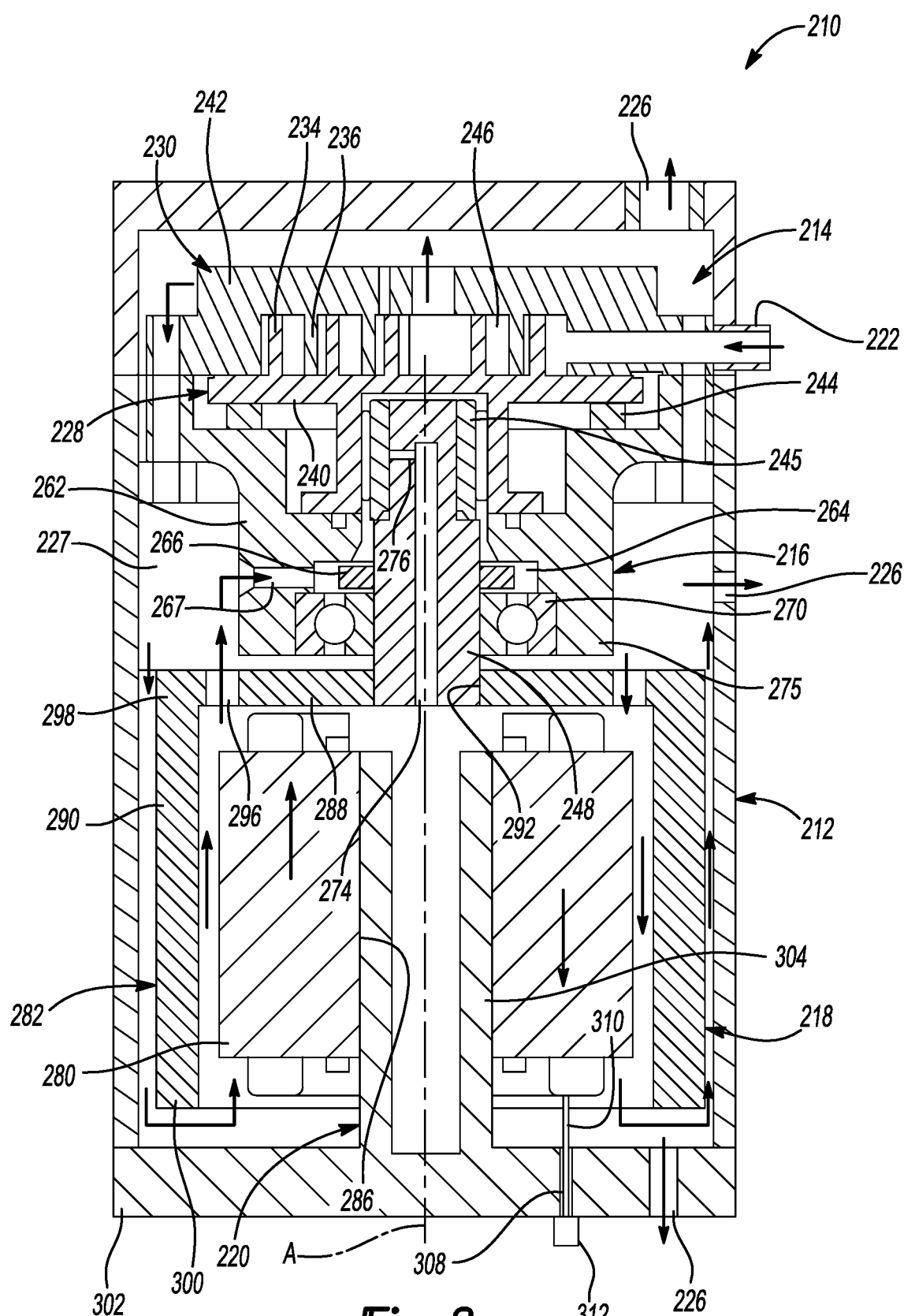
FIG. 2 is a cross-sectional view of another compressor according to the principles of the present disclosure.

With reference to FIG. 2, another compressor 210 is provided. The compressor 210 may include a shell 212, a compression mechanism 214, a bearing housing assembly 216, a motor assembly 218, and a stator support member 220. The shell 212 may house the compression mechanism 214, the bearing housing assembly 216, the motor assembly 218, and the stator support member 220. The shell 212 may include a suction inlet port 222 receiving a working fluid at a suction pressure from one of an indoor and outdoor heat exchanger (not shown) of a climate control system and one or more discharge outlet ports 226 discharging the working fluid to the other of the indoor and outdoor heat exchanger after it has been compressed by the compression mechanism 214. The shell 212 defines a discharge-pressure chamber 227 in which the compression mechanism 214, the bearing housing assembly 216, the motor assembly 218, and the stator support member 220 are disposed. The compressor 210 may be a sumpless compressor—i.e., the compressor 210 might not include a lubricant sump. Instead, lubricant entrained in working fluid discharged from the compression mechanism 214 may circulate throughout the shell 212 and lubricate various moving components of the compressor 210.

The compression mechanism 214 may include an orbiting scroll member 228 and a non-orbiting scroll member 230. The non-orbiting scroll member 230 may be fixed to the shell 212 (e.g., by press fit and/or staking) and/or the bearing housing assembly 216 (e.g., by a plurality of fasteners). The orbiting and non-orbiting scroll members 228, 230 include orbiting and non-orbiting spiral wraps 234, 236, respectively, that meshingly engage each other and extend from orbiting and non-orbiting end plates 240, 242, respectively. A driveshaft 248 may rotatably engage the orbiting scroll member 228, via a bushing 245, to cause orbital movement of the orbiting scroll member 228 relative to the non-orbiting scroll member 230 as the driveshaft 248 rotates about a rotational axis A. An Oldham coupling 244 may be keyed to the orbiting scroll member 228 and a stationary structure (e.g., the bearing housing assembly 216 or the non-orbiting scroll member 230) to prevent relative rotation between the orbiting and non-orbiting scroll members 228, 230 while allowing the orbiting scroll member 228 to move in an orbital path relative to the non-orbiting scroll member 230. Moving fluid pockets 246 are formed between the orbiting and non-orbiting spiral wraps 234, 236 that decrease in size as they move from a radially outer position to a radially inner position, thereby compressing the working fluid therein from the suction pressure to the discharge pressure.

The bearing housing assembly 216 may include a single bearing housing 262 and a single bearing 270. The bearing housing 262 may be fixed relative to the shell 212 and may support the non-orbiting scroll member 230 and may define a thrust bearing surface for the orbiting scroll member 228. The bearing housing 262 may include a tubular portion 275 that receive the bearing 270 and the driveshaft 248. In the configuration shown in FIG. 2, the driveshaft 248 is rotatably supported only by the single bearing housing 262 and the single bearing 270 (i.e., the driveshaft 248 is not supported by the stator support member 220). In other configurations, the driveshaft 248 may be rotatably supported only by the single bearing housing 262 and one double bearing (or other appropriate bearing). The tubular portion 275 may define a counterweight cavity 264 in which a counterweight 266 attached to the driveshaft 248 may rotate. A fluid passageway 267 may extend radially through an outer periphery of the tubular portion 275 and into the counterweight cavity 264. Discharge gas from the discharge chamber 227 and lubricant entrained in the discharge gas may flow into the counterweight cavity 264 through the fluid passageway 267 to lubricate the driveshaft 248, the bushing 245, the orbiting scroll member 228 and the bearing 270.

The driveshaft 248 may include an axially extending fluid passageway 274 and a radially extending fluid passageway 276 that are in fluid communication with each other and the discharge chamber 227. Discharge gas from the discharge chamber 227 and lubricant entrained in the discharge gas may flow though the fluid passageways 274, 276 and may lubricate the interface between the driveshaft 248 and the bushing 245.

The motor assembly 218 may be similar or identical to the motor assembly 18 described above, and therefore, will not be described again in detail. Briefly, the motor assembly 218 may include a stator 280 and a rotor 282. The stator 280 may define an axially extending aperture 286 that receives the stator support member 220 such that the stator 280 is fixed to the stator support member 220, as described above.

Like the rotor 82, the rotor 282 may be disposed about the stator 280 and includes a central aperture 292 that receives the driveshaft 248 at or near an axial end of the driveshaft 248. The rotor 282 may include a radially extending portion 288 and an axially extending portion 290 that cooperate to form a U-shaped cross section. The radially extending portion 288 may include one or more fluid passageways 296 disposed radially between the central aperture 292 and the axially extending portion 290. The fluid passageways 296 and space between the shell 212 and the axially extending portion 290 of the rotor 282 may facilitate the flow of discharge gas and lubricant entrained in the discharge gas throughout the discharge chamber 227 to lubricate and cool various compressor components such as the stator 280 and rotor 282.

The axially extending portion 290 of the rotor 282 may be a generally tubular member and may include a first axial end 298 and a second axial end 300. The radially extending portion 288 may extend radially inward from the first axial end 298. In some configurations, the second axial end 300 is unsupported by the shell 212, the compression mechanism 214, the bearing housing assembly 216, the stator support member 220 or any other structure. The axially extending portion 290 is disposed radially outward relative to the stator 280 (i.e., radially between the stator 280 and the shell 212).

The stator support member 220 may be similar or identical to the stator support member 20 described above, and therefore, will not be described again in detail. Briefly, the stator support member 220 may include a flange portion 302 and a tubular portion 304. The flange portion 302 may define an end cap of the shell 212 and may include the discharge outlet port 226. The flange portion 302 may also include one or more sealed wire apertures 308. Wires 310 connected to the stator 280 may extend through the wire aperture 308 to a terminal assembly 312 attached to the shell 212 for electrical connection to a source of electrical power and a compression control system (not shown). In some configurations, the wire aperture 308 may be a fluid passageway through which discharge gas may flow. Like the tubular portion 104, the tubular portion 304 may extend longitudinally through at least a portion of the aperture 286 of the stator 280 such that the stator 280 is fixedly attached to the tubular portion 304. That is, the stator 280 is disposed radially between the tubular portion 304 and the axially extending portion 290 of the rotor 282.

As described above, the structure of the motor assembly 218 and stator support member 220 provides several advantages. As described above, the positioning of the rotor 282 such that the radially extending portion 288 is disposed axially between the stator 280 and the bearing housing 262 and attaching the radially extending portion 288 to the driveshaft 248 allows the length of the driveshaft 248 to be substantially reduced, which results in increased driveshaft stiffness and reduced vibration during operation of the compressor 210. By having the tubular portion 304 axially spaced apart from the driveshaft 248 along the rotational axis A, a flow path is created that may facilitate the flow of discharge gas and lubricant entrained in the discharge gas through the fluid passageways 274, 276 and lubricate the interface between the driveshaft 248 and the bushing 245. Furthermore, the positioning of an open end (i.e., at the second axial end 300) of the U-shaped rotor 282 facing toward the terminal assembly 312 and away from the bearing housing assembly 216 and the compression mechanism 214 allows the wires 310 to be more easily routed between the stator 280 and the terminal assembly 312, thereby making assembly of the compressor 210 simpler.

Figure 3:
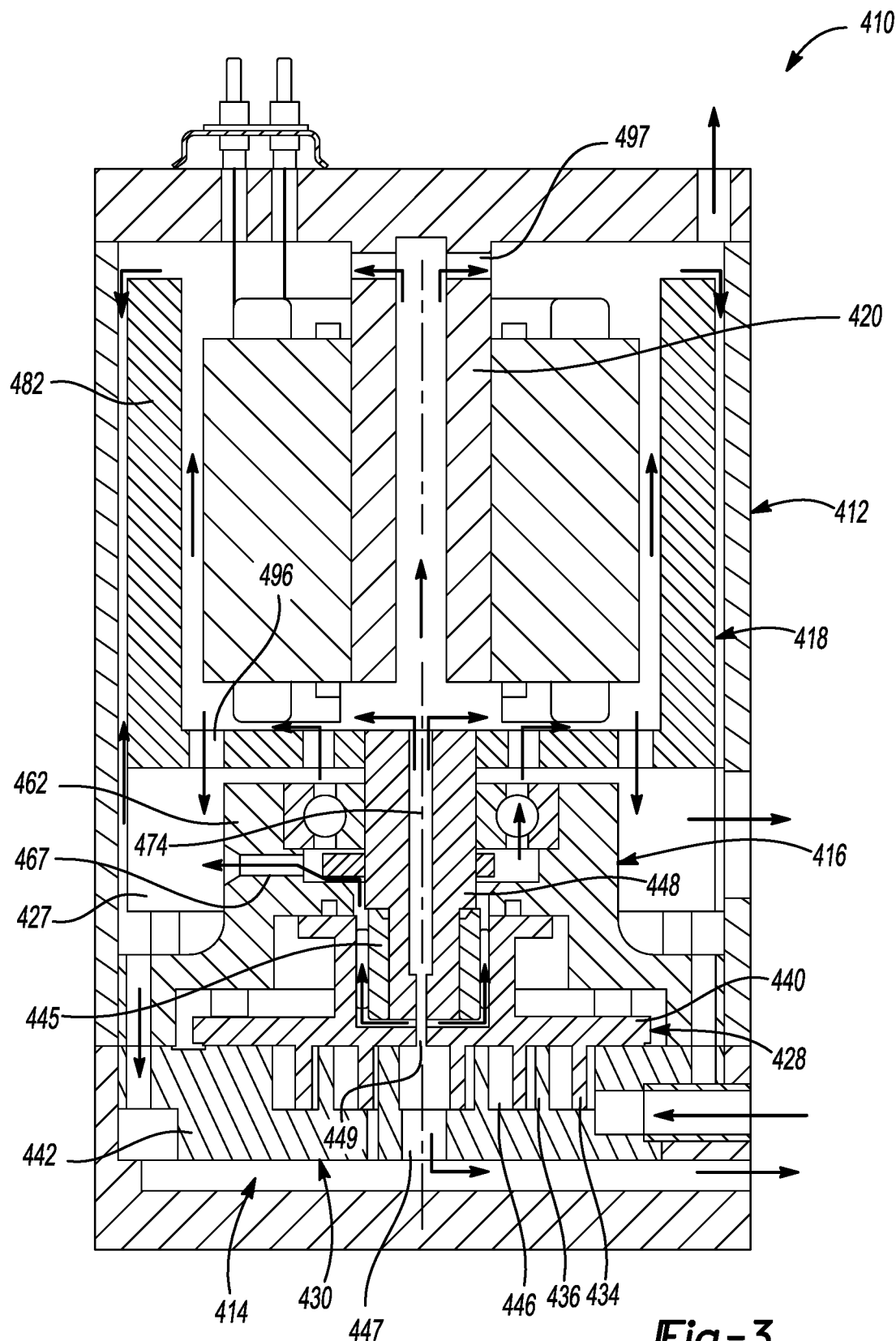
FIG. 3 is a cross-sectional view of yet another compressor according to the principles of the present disclosure.

With reference to FIG. 3, another compressor 410 is provided that may include a shell 412, a compression mechanism 414, a bearing housing assembly 416, a motor assembly 418, and a stator support member 420. The compressor 410 may be similar or identical to the compressor 210 described above, except the orientation of the shell 412, compression mechanism 414, bearing housing assembly 416, motor assembly 418 and stator support member 420 may be vertically inverted (i.e., upside down) relative to the orientation of the compressor 210. Otherwise, the structure and function of the shell 412, compression mechanism 414, bearing housing assembly 416, motor assembly 418 and stator support member 420 may be similar or identical to that of the shell 212, compression mechanism 214, bearing housing assembly 216, motor assembly 218 and stator support member 220 described above, apart from any exceptions described below and/or shown in the figures.

Like the compression mechanism 214, the compression mechanism 414 may include an orbiting scroll member 428 and a non-orbiting scroll member 430 that include spiral wraps 434, 436 that cooperate to form compression pockets 446 that move radially inward as a driveshaft 448 (driven by the motor assembly 418) moves the orbiting scroll member 428 in an orbital path. An end plate 442 of the non-orbiting scroll member 430 may include a first discharge passage 447 through which compressed working fluid (e.g., discharge-pressure working fluid) may exit the compression mechanism 414 and enter a discharge chamber 427 (like the discharge chamber 227) defined by the shell 412. An end plate 440 of the orbiting scroll member 428 may include a second discharge passage 449 through which compressed working fluid (e.g., at the same discharge pressure as the fluid discharged through the first discharge passage 447) may exit the compression mechanism 414 and enter the discharge chamber 427. While not shown in FIG. 2, in some configurations, the orbiting scroll member 228 of the compressor 210 may include a discharge passage like the discharge passage 449.

The driveshaft 448 may include a fluid passageway 474 that may extend axially through an entire axial length of the driveshaft 448. Fluid (e.g., discharge gas and entrained lubricant) discharged from the compression mechanism 414 through the second discharge passage 449 may flow around the driveshaft 448 and bushing 445 and/or through the fluid passageway 474 and may flow around the discharge chamber 427 and through fluid passageways 467, 496, 497 in bearing housing 462, rotor 482 and stator support member 420, respectively, to cool various moving components of the compressor 410.

Figure 4:
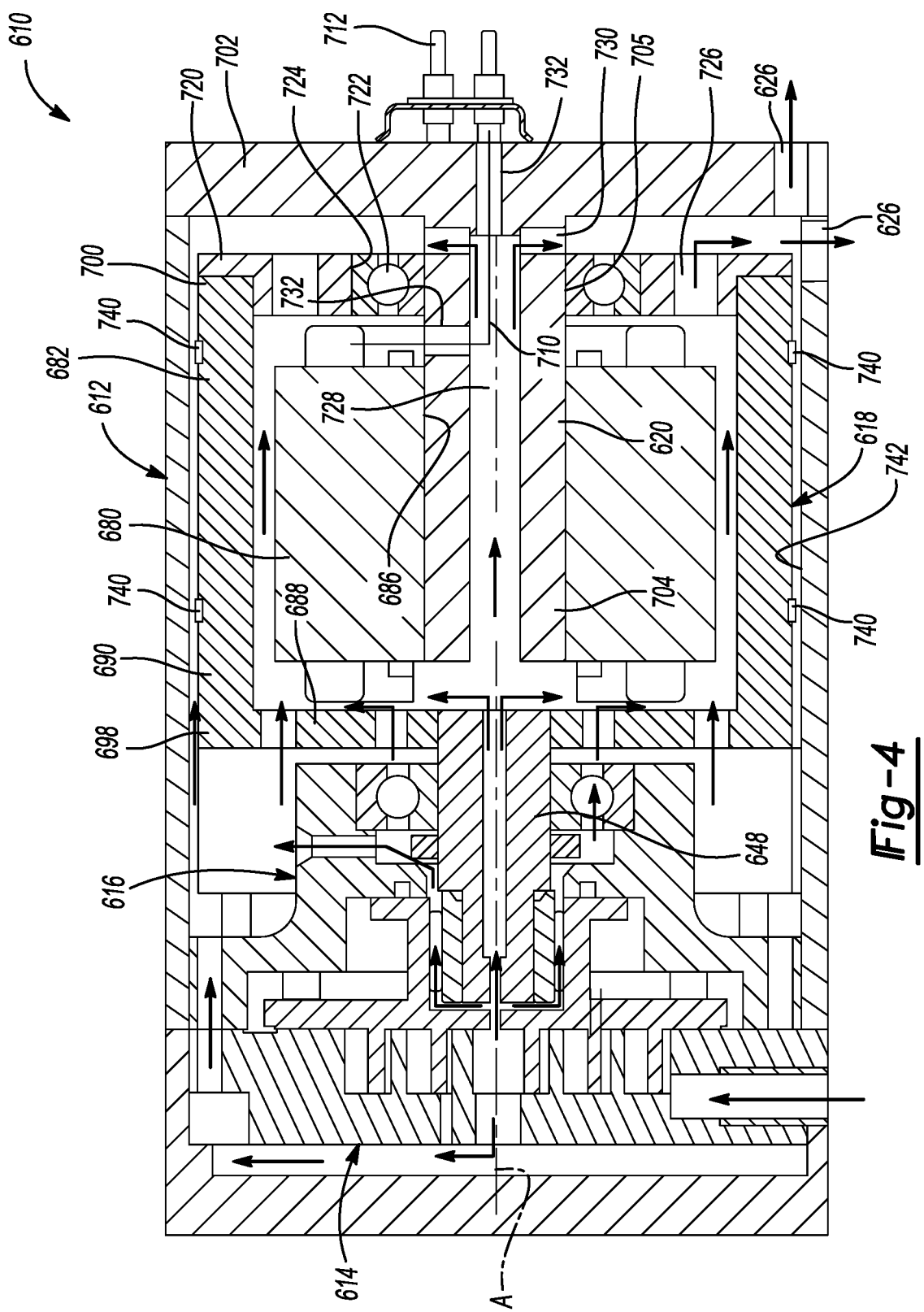
FIG. 4 is a cross-sectional view of yet another compressor according to the principles of the present disclosure.

With reference to FIG. 4, another compressor 610 is provided that may include a shell 612, a compression mechanism 614, a bearing housing assembly 616, a motor assembly 618, and a stator support member 620. The compressor 610 may be similar or identical to the compressor 210, 410 described above, except the orientation of the shell 612, compression mechanism 614, bearing housing assembly 616, motor assembly 618 and stator support member 620 may be horizontal (i.e., with a rotational axis A of driveshaft 648 being oriented horizontally). Otherwise, the structure and function of the shell 612, compression mechanism 614, bearing housing assembly 616, motor assembly 618 and stator support member 620 may be similar or identical to that of the shell 212, 412, compression mechanism 214, 414, bearing housing assembly 216, 416, motor assembly 218, 418 and stator support member 220, 420 described above, apart from any exceptions described below and/or shown in the figures.

As described above with reference to the motor assembly 218, the motor assembly 618 may include a stator 680 and a rotor 682. The stator 680 may include an aperture 686 in which a tubular portion 704 of the stator support member 620 is received. Like the rotor 82, 282, 482, the rotor 682 includes a radially extending portion 688 and an axially extending portion 690 that cooperate to form a generally U-shaped cross section. The radially extending portion 688 engages the driveshaft 648. A first axial end 698 of the axially extending portion 690 extends from the radially extending portion 688.

An annular collar 720 may be attached to a second axial end 700 of the axially extending portion 690. The collar 720 may extend radially inward from the second axial end 700. A bearing 722 may be attached to an outer diametrical surface 705 of the tubular portion 704 of the stator support member 620 and to an inner diametrical surface 724 of the collar 720. In this manner, the collar 720, bearing 722 and the tubular portion 704 of the stator support member 620 cooperate to rotatably support the second axial end 700 of the rotor 682. Such rotatable support of the second axial end 700 may be particularly beneficial for a horizontal compressor, like the compressor 610, as the force of gravity could impart rotational imbalance on the rotor 682 if the second axial end 700 was rotatably unsupported. The collar 720 and bearing 722 increase the rigidity of the rotor 682 and reduce vibration. In some configurations, a counterweight (not shown) can be mounted to or integrally formed with the collar 720 or the axially extending portion 690 of the rotor 682.

In some configurations, the collar 720 may include one or more fluid passageways 726. Furthermore, the tubular portion 704 may include an axially extending fluid passageway 728 and one or more radially extending fluid passageways 730. The tubular portion 704 and a flange portion 702 (which may act as an end cap of the shell 612) of the stator support member 620 may each include a wire aperture 732 through which wires 710 can extend between the stator 680 and a terminal assembly 712, as described above.

In some configurations, an outer diametrical surface of the axially extending portion 690 of the rotor 682 may include one or more features 740 (e.g., fins, spirals, protrusions, grooves, etc.) that push lubricant along a bottom surface 742 of the shell 612 toward a discharge outlet port 626 of the shell 612. In this manner, lubricant is prevented from accumulating or pooling on the bottom surface 742.

Figure 5:
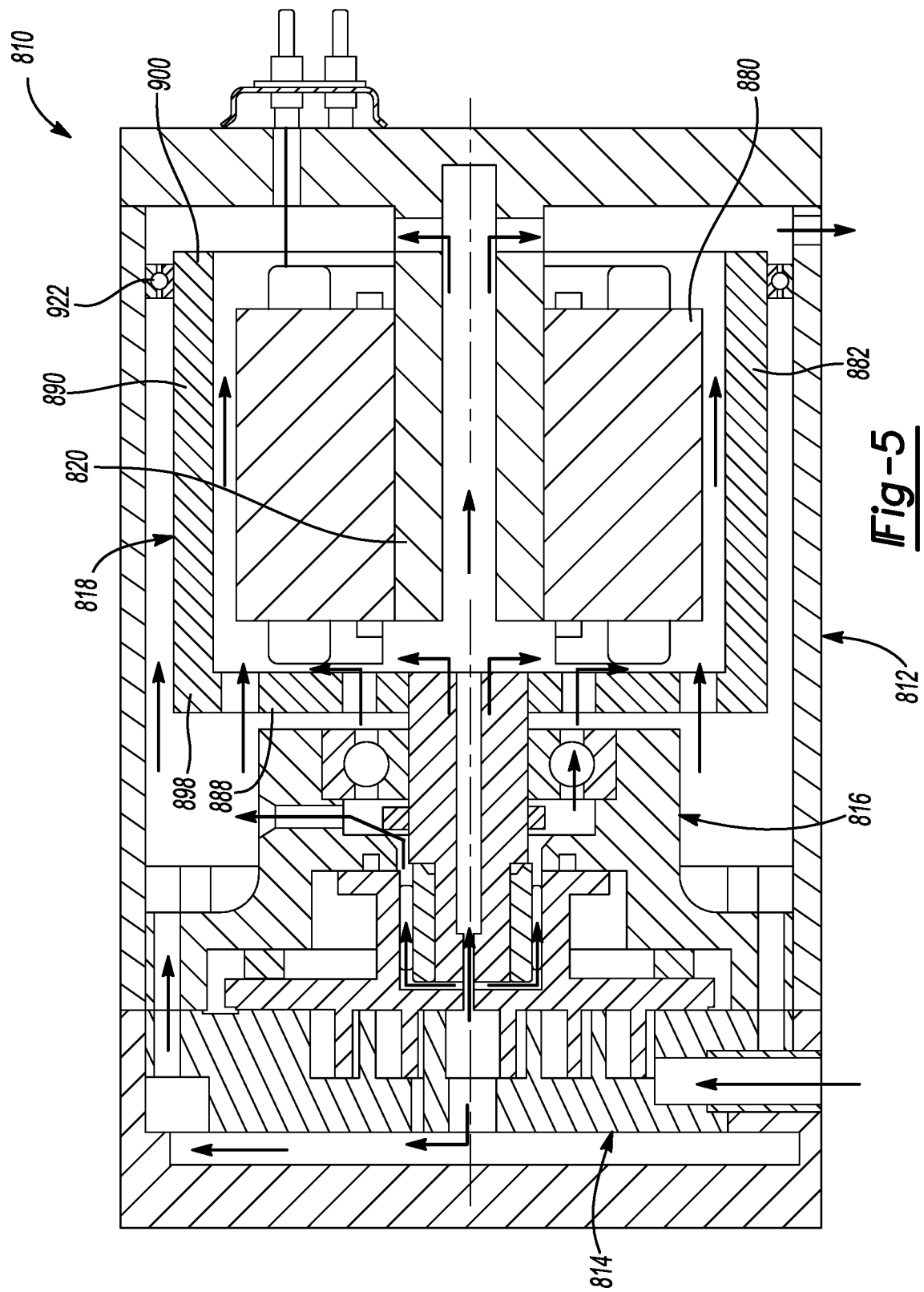
FIG. 5 is a cross-sectional view of yet another compressor according to the principles of the present disclosure.

With reference to FIG. 5, another compressor 810 is provided that may include a shell 812, a compression mechanism 814, a bearing housing assembly 816, a motor assembly 818, and a stator support member 820. The structure and function of the shell 812, compression mechanism 814, bearing housing assembly 816, motor assembly 818 and stator support member 820 may be similar or identical to that of the shell 612, compression mechanism 614, bearing housing assembly 616, motor assembly 618 and stator support member 620 described above, apart from any exceptions described below and/or shown in the figures.

The motor assembly 818 may include a stator 880 and a rotor 882. As described above, the rotor 882 includes a radially extending portion 888 and an axially extending portion 890. A first axial end 898 of the axially extending portion 890 extends from the radially extending portion 888. An annular bearing 922 may engage the shell 812 and a second axial end 900 of the axially extending portion 890. That is, the annular bearing 922 extends radially between the axially extending portion 890 and the shell 812. In this manner, the annular bearing 922 and the shell 812 rotatably support the second axial end 900 of the rotor 882 to increase the rigidity of the rotor 882 and reduce vibration.

Figure 6:
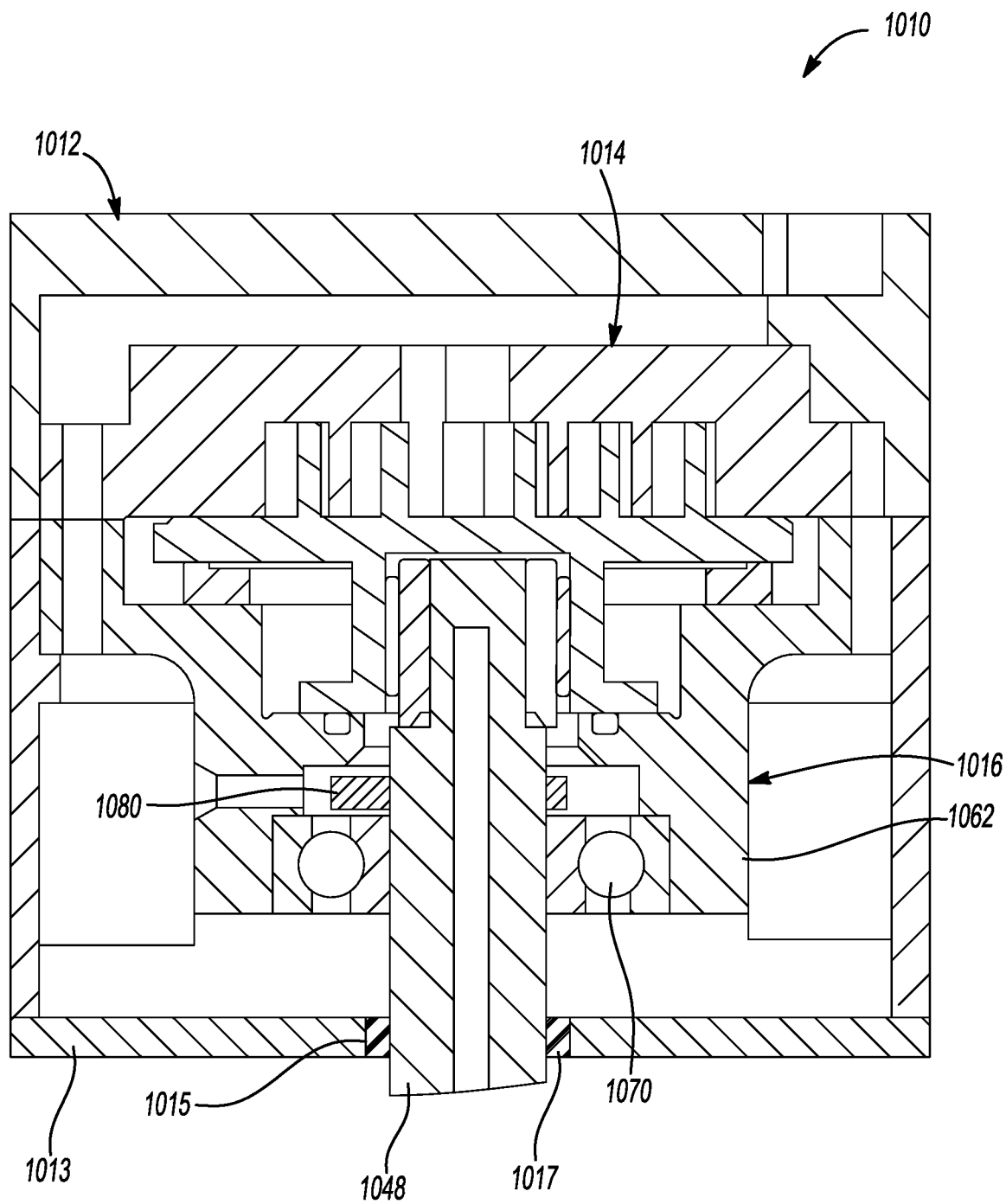
FIG. 6 is a cross-sectional view of yet another compressor according to the principles of the present disclosure.

With reference to FIG. 6, another compressor 1010 is provided that may include a shell 1012, a compression mechanism 1014, a bearing housing assembly 1016, and a driveshaft 1048. The compressor 1010 is an open-drive compressor. That is, the compressor 1010 does not include a motor assembly within the shell 1012. Instead, the driveshaft 1048 may be driven by an external motor or engine (neither of which are shown).

The structure and function of the compression mechanism 1014 and bearing housing assembly 1016 may be similar or identical to that of the compression mechanism 214, 414, 614, 814 and the bearing housing assembly 216, 416, 616, 816, and therefore, will not be described again in detail.

Briefly, the bearing housing assembly 1016 may include a single bearing housing 1062 and a single bearing 1070. The bearing housing 1062 and the bearing 1070 may provide the only rotational support for the driveshaft 1048. In other words, the driveshaft 1048 is rotatably supported only by the bearing housing 1062 and the bearing 1070. A counterweight 1080 may be attached to the driveshaft 1048. In other configurations, the driveshaft 1048 may be rotatably supported only by the single bearing housing 1062 and one double bearing (or other appropriate bearing).

An end cap 1013 of the shell 1012 includes an aperture 1015 through which the driveshaft 1048 extends. A seal member 1017 may engage the driveshaft 1048 and the end cap 1013 but does not rotationally support the driveshaft 1048.

It will be appreciated that any of the compressors 10, 210, 410, 610, 810, 1010 described above could be capacity-modulated compressor including variable-volume-ratio ports and valves, vapor injection, digital modulation (scroll separation), and/or any other means for modulating capacity. Furthermore, while the compressors 10, 210, 410, 610, 810, 1010 shown in the figures are high-side compressors, it will be appreciated that any of the compressors 10, 210, 410, 610, 810, 1010 could be low-side compressors.

In FIGS. 1-5, arrows are provided to indicate examples of the directions in which working fluid may flow through and/or around various components disposed within the shell 12, 212, 412, 612, 812. In some configurations, the working fluid flow through and/or around some of such components could be in directions other than the directions indicated by the arrows.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
    a shell;
    a compression mechanism disposed within the shell;
    a driveshaft drivingly engaged with the compression mechanism;
    a motor assembly disposed within the shell and drivingly engaged with the driveshaft, the motor assembly including a rotor and a stator, the stator is fixed relative to the shell, the rotor including an axially extending portion and a radially extending portion, the axially extending portion disposed radially outward relative to the stator, the radially extending portion engaging the driveshaft and disposed axially between the stator and the compression mechanism; and
    a stator support member fixed relative to the shell and the stator, the stator support member extending longitudinally through at least a portion of the stator and axially spaced apart from the driveshaft,
    wherein the driveshaft includes a fluid passageway in fluid communication with a discharge chamber defined by said shell, and
    wherein the compression mechanism includes an orbiting scroll member and a non-orbiting scroll member, the non-orbiting scroll member including a first discharge passage in fluid communication with the discharge chamber, the orbiting scroll member including a second discharge passage in fluid communication with the fluid passageway in the driveshaft.

2. The compressor of claim 1, further comprising a bearing housing rotatably supporting the driveshaft, wherein the radially extending portion of the rotor is disposed axially between the stator and the bearing housing.

3. The compressor of claim 2, wherein the radially extending portion of the rotor is attached to a first axial end of the driveshaft.

4. The compressor of claim 3, wherein a second axial end of the driveshaft drivingly engages the compression mechanism.

5. The compressor of claim 3, wherein the driveshaft includes an eccentric portion disposed axially between the first axial end of the driveshaft and a second axial end of the driveshaft.

6. The compressor of claim 1, wherein the stator support member includes a tubular portion that engages the stator and includes a first fluid passageway extending therethrough.

7. The compressor of claim 6, wherein the stator support member includes a flange portion disposed at an axial end of the tubular portion and extending radially outward from the tubular portion.

8. The compressor of claim 1, wherein the stator support member includes an aperture, and wherein one or more wires connected to the stator extend through the aperture.

9. The compressor of claim 1, wherein the radially extending portion of the rotor includes at least one fluid passageway extending therethrough and is disposed radially between the driveshaft and the axially extending portion of the rotor.

10. The compressor of claim 1, wherein an outer diametrical surface of the axially extending portion of the rotor includes a plurality of fins fixed thereto.

11. The compressor of claim 1, wherein the compressor is a sumpless compressor that lacks a lubricant sump.

12. A compressor comprising:
    a shell;
    a compression mechanism disposed within the shell;
    a driveshaft drivingly engaged with the compression mechanism;
    a bearing housing rotatably supporting the driveshaft;
    a motor assembly disposed within the shell and drivingly engaged with the driveshaft, the motor assembly including a rotor and a stator, the stator is fixed relative to the shell, the rotor having a U-shaped cross section including an axially extending portion and a radially extending portion, the axially extending portion disposed radially outward relative to the stator, the radially extending portion engaging the driveshaft and disposed axially between the stator and the bearing housing; and
    a stator support member fixed relative to the shell and the stator, the stator support member extending longitudinally through at least a portion of the stator, the stator support member is axially spaced apart from the driveshaft,
    wherein the driveshaft includes a fluid passageway in fluid communication with a discharge chamber defined by said shell, and
    wherein the compression mechanism includes an orbiting scroll member and a non-orbiting scroll member, the non-orbiting scroll member including a first discharge passage in fluid communication with the discharge chamber, the orbiting scroll member including a second discharge passage in fluid communication with the fluid passageway in the driveshaft.

13. The compressor of claim 12, wherein the stator support member includes a tubular portion that engages the stator and includes a first fluid passageway extending therethrough.

14. The compressor of claim 13, wherein the stator support member includes a flange portion disposed at an axial end of the tubular portion and extending radially outward from the tubular portion.

15. The compressor of claim 14, wherein the stator support member includes an aperture, and wherein one or more wires connected to the stator extend through the aperture.

16. The compressor of claim 15, wherein the radially extending portion of the rotor includes at least one fluid passageway extending therethrough and disposed radially between the driveshaft and the axially extending portion of the rotor.

17. The compressor of claim 16, wherein an outer diametrical surface of the axially extending portion of the rotor includes a plurality of fins fixed thereto.

18. The compressor of claim 12, wherein the compressor is a sumpless compressor that lacks a lubricant sump.

* * * * *